United States Patent
Cheng

(10) Patent No.: US 12,099,194 B2
(45) Date of Patent: Sep. 24, 2024

(54) VIRTUAL AND AUGMENTED REALITY SYSTEMS AND METHODS

(71) Applicant: Magic Leap, Inc., Plantation, FL (US)

(72) Inventor: Hui-Chuan Cheng, Cooper City, FL (US)

(73) Assignee: Magic Leap, Inc., Plantation, FL (US)

( * ) Notice: Subject to any disclaimer, the term of this patent is extended or adjusted under 35 U.S.C. 154(b) by 0 days.

(21) Appl. No.: 18/153,281

(22) Filed: Jan. 11, 2023

(65) Prior Publication Data

US 2023/0168516 A1 Jun. 1, 2023

Related U.S. Application Data

(63) Continuation of application No. 16/913,872, filed on Jun. 26, 2020, now Pat. No. 11,586,043, which is a
(Continued)

(51) Int. Cl.
*G02B 27/01* (2006.01)
*F21V 8/00* (2006.01)
(Continued)

(52) U.S. Cl.
CPC ....... *G02B 27/0172* (2013.01); *G02B 6/0016* (2013.01); *G02B 6/0076* (2013.01);
(Continued)

(58) Field of Classification Search
CPC .... G02B 6/0076; G02B 6/0018; G02B 6/002; G02B 27/0101; G02B 6/0028;
(Continued)

(56) References Cited

U.S. PATENT DOCUMENTS

| 6,010,221 A | 1/2000 | Maki et al. |
| 8,964,298 B2 | 2/2015 | Haddick et al. |

(Continued)

FOREIGN PATENT DOCUMENTS

| CN | 103913940 | * 7/2014 | .......... H04N 9/3111 |
| EP | 2196729 | 6/2010 | |

(Continued)

OTHER PUBLICATIONS

Foreign NOA for JP Patent Appln. No. 2021-145198 dated May 19, 2023.

(Continued)

*Primary Examiner* — Brandi N Thomas
(74) *Attorney, Agent, or Firm* — Vista IP Law Group, LLP

(57) ABSTRACT

An imaging system includes a light source configured to generate a light beam. The system also includes first and second light guiding optical elements having respective first and second entry portions, and configured to propagate at least respective first and second portions of the light beam by total internal reflection. The system further includes a light distributor having a light distributor entry portion, a first exit portion, and a second exit portion. The light distributor is configured to direct the first and second portions of the light beam toward the first and second entry portions, respectively. The light distributor entry portion and the first exit portion are aligned along a first axis. The light distributor entry portion and the second exit portion are aligned along a second axis different from the first axis.

20 Claims, 19 Drawing Sheets

Related U.S. Application Data continuation of application No. 15/443,002, filed on Feb. 27, 2017, now Pat. No. 10,739,593.

(60) Provisional application No. 62/301,502, filed on Feb. 29, 2016.

(51) Int. Cl.
  *G02B 27/14* (2006.01)
  *G02B 27/10* (2006.01)
  *G02B 27/28* (2006.01)
  *G02B 27/42* (2006.01)

(52) U.S. Cl.
  CPC .... *G02B 27/141* (2013.01); *G02B 2027/0114* (2013.01); *G02B 2027/0125* (2013.01); *G02B 2027/0185* (2013.01); *G02B 2027/0194* (2013.01); *G02B 27/1006* (2013.01); *G02B 27/283* (2013.01); *G02B 27/4205* (2013.01)

(58) Field of Classification Search
  CPC ...... G02B 6/003; G02B 6/005; G02B 6/0053; G02B 6/006; G02B 6/0065; G02B 6/0068; G02B 6/0088; G02B 2027/0185; G02B 2027/0194; G02B 27/0172; G02B 27/1006; G02B 27/141; G02B 6/0016; G02B 2027/0114; G02B 2027/0125; G02B 27/283; G02B 27/4205; G02B 2027/0178; G02B 27/143; G02B 6/0046; G02B 6/0055; G02B 6/266; G02B 6/2804; G02B 6/3552; G02B 17/0856; G02B 17/0864; G02B 2006/12061; G02B 2006/12159; G02B 21/06; G02B 21/16; G02B 23/243; G02B 26/0833; G02B 27/0905; G02B 27/0944; G02B 27/0955; G02B 27/0961; G02B 27/0983; G02B 27/14; G02B 27/144; G02B 27/145; G02B 27/16; G02B 27/48; G02B 5/0808; G02B 6/0038; G02B 6/0073; G02B 6/0096; G02B 6/125; G02B 6/126; G02B 6/241; G02B 6/2808; G02B 6/2813; G02B 6/2821; G02B 6/2835; G02B 6/2856; G02B 6/2938; G02B 6/29383; G02B 6/29395; G02B 6/3502; G02B 6/3514; G02B 6/357; G02B 6/3588; G02B 6/3594; G02B 7/002; G02F 1/133616; G02F 1/225; G02F 1/0121; G02F 1/0152; G02F 1/0311; G02F 1/065; G02F 1/2255; G02F 1/2257; G02F 1/3517; G02F 2201/08; G02F 2203/06
  See application file for complete search history.

(56) References Cited

U.S. PATENT DOCUMENTS

| | | | |
|---|---|---|---|
| 9,671,566 B2 | 6/2017 | Abovitz et al. | |
| 2004/0125228 A1 | 7/2004 | Dougherty | |
| 2006/0114565 A1 | 6/2006 | Le Hors et al. | |
| 2008/0205077 A1* | 8/2008 | Lenderink | G02B 27/0994 362/555 |
| 2008/0267562 A1 | 10/2008 | Wang et al. | |
| 2009/0244717 A1 | 10/2009 | Tocci | |
| 2011/0242661 A1 | 10/2011 | Simmonds | |
| 2011/0254932 A1* | 10/2011 | Doung | H04N 13/341 348/51 |
| 2013/0088780 A1 | 4/2013 | Jarvenpaa et al. | |
| 2014/0003762 A1 | 1/2014 | Macnamara | |
| 2014/0064655 A1 | 3/2014 | Nguyen et al. | |
| 2014/0118813 A1 | 5/2014 | Amitai et al. | |
| 2014/0177023 A1 | 6/2014 | Gao et al. | |
| 2015/0138451 A1 | 5/2015 | Amitai | |
| 2015/0168731 A1* | 6/2015 | Robbins | G06T 19/006 345/8 |
| 2015/0205126 A1 | 7/2015 | Schowengerdt | |
| 2015/0234476 A1 | 8/2015 | Schowengerdt et al. | |
| 2015/0309316 A1 | 10/2015 | Osterhout et al. | |
| 2015/0346490 A1 | 12/2015 | Tekolste et al. | |
| 2015/0346495 A1 | 12/2015 | Welch et al. | |
| 2016/0011419 A1 | 1/2016 | Gao | |
| 2016/0357095 A1* | 12/2016 | Miyazaki | G02B 6/0056 |

FOREIGN PATENT DOCUMENTS

| | | |
|---|---|---|
| JP | 2004-258332 | 9/2004 |
| JP | 2006-317563 | 11/2006 |
| JP | 2009-186794 | 8/2009 |
| JP | 2010-282231 | 12/2010 |
| JP | 2015-194654 | 11/2015 |
| WO | WO 2015/081313 | 6/2015 |
| WO | WO 2015/184412 | 12/2015 |

OTHER PUBLICATIONS

Extended European Search Report for EP Patent Appln. No. 22195502.4 dated Jan. 20, 2023.
Foreign Response for JP Patent Appln. No. 2021-145198 dated Feb. 16, 2023.
Foreign NOA for IL Patent Appln. No. 299514 dated May 29, 2023 in English.
Foreign Request for ReExam for CN Patent Appln. No. 202010944998.6 dated Jan. 16, 2023.
Extended European Search Report mailed Feb. 11, 2019 for EP application No. 17760524.3, Applicant Magic Leap, Inc. 8 pages.
Response Extended European Search Report filed Sep. 10, 2019 for European application No. 17760524.3, Applicant Magic Leap, Inc. 18 pages.
Amendment filed Jan. 20, 2020 for U.S. Appl. No. 15/443,002, Applicant Magic Leap.
PCT International Search Report and Written Opinion for International Appln. No. PCT/US2017/019601, Applicant Magic Leap, Inc., dated Jun. 15, 2017 (14 pages).
1st Office Action for Chinese Patent Appln. No. 201780012265.5 dated Feb. 6, 2020.
Office Action Response for Chinese Patent Appln. No. 201780012265.5 dated Jun. 17, 2020.
1st Exam Report for AU Patent Appln. No. 2017228307 dated Nov. 9, 2020.
Foreign OA for JP Patent Appln. No. 2018-545186 dated Jan. 8, 2021.
Foreign Response for JP Patent Appln. No. 2018-545186 dated Mar. 31, 2021.
Foreign Exam Report for IN Patent Appln. No. 201847034903 dated May 20, 2021.
Foreign NOA for JP Patent Appln. No. 2018-545186 dated Aug. 13, 2021.
Foreign Response for AU Patent Appln. No. 2017228307 dated Oct. 13, 2021.
Foreign OA for IL Patent Appln. No. 261138 dated Nov. 19, 2021.
Foreign OA for CN Patent Appln. No. 202010944998.6 dated Nov. 23, 2021.
Foreign Response for CN Patent Appln. No. 202010944998.6 dated Mar. 23, 2022.
Foreign Exam Report for NZ Patent Appln. No. 745044 dated Mar. 29, 2022.
Non-Final Office Action for U.S. Appl. No. 16/913,872 dated Apr. 25, 2022.
Foreign Intention to Grant for EP Patent Appln. No. 17760524.3 dated May 13, 2022.
Foreign OA for CN Patent Appln. No. 202010944998.6 dated May 27, 2022 with English translation.
Foreign OA for JP Patent Appln. No. 2021-145198 dated Jun. 21, 2022.

(56) References Cited

OTHER PUBLICATIONS

Amendment Response for U.S. Appl. No. 16/913,872 dated Jul. 25, 2022.
Foreign Response for CN Patent Appln. No. 202010944998.6 dated Jul. 29, 2022.
Foreign Response for JP Patent Appln. No. 2021-145198 dated Sep. 20, 2022.
Notice of Allowance for U.S. Appl. No. 16/913,872 dated Oct. 14, 2022.
Foreign Decision Rejection for CN Patent Appln. No. 202010944998.6 dated Oct. 10, 2022 (with English translation).
Foreign NOA for IL Patent Appln. No. 261138 dated Sep. 29, 2022.
Foreign OA for JP Patent Appln. No. 2021-145198 dated Nov. 22, 2022 (with English translation).
Foreign Response for EP Patent Appln. No. 22195502.4 dated Aug. 22, 2023.
Foreign Refusal Order for IN Patent Appln. No. 201847034903 dated Jan. 10, 2024 in English.
Foreign NOA for JP Patent Appln. No. 2023-99158 dated May 2, 2024.
Foreign OA for KR Patent Appln. No. 10-2018-7028218 dated Apr. 12, 2024 (with English translation).
Foreign NOA for EP Patent Appln. No. 22195502.4 dated May 28, 2024.
Foreign Response for KR Patent Appln. No. 10-2018-7028218 dated Jun. 12, 2024.

* cited by examiner

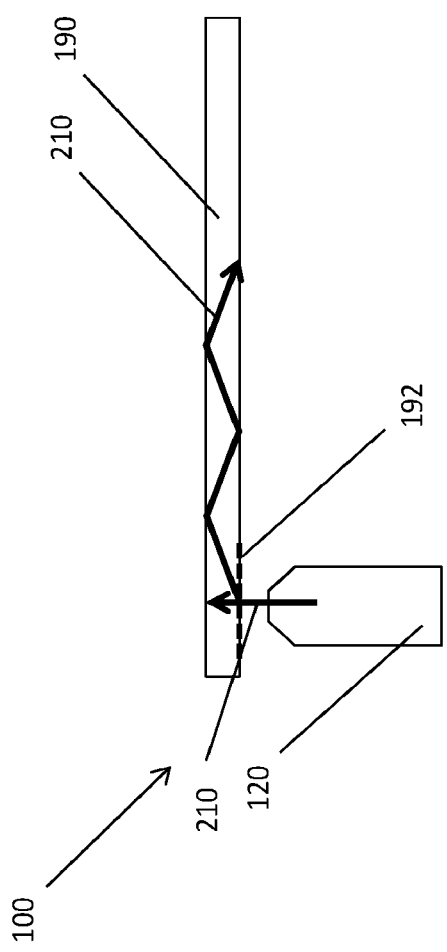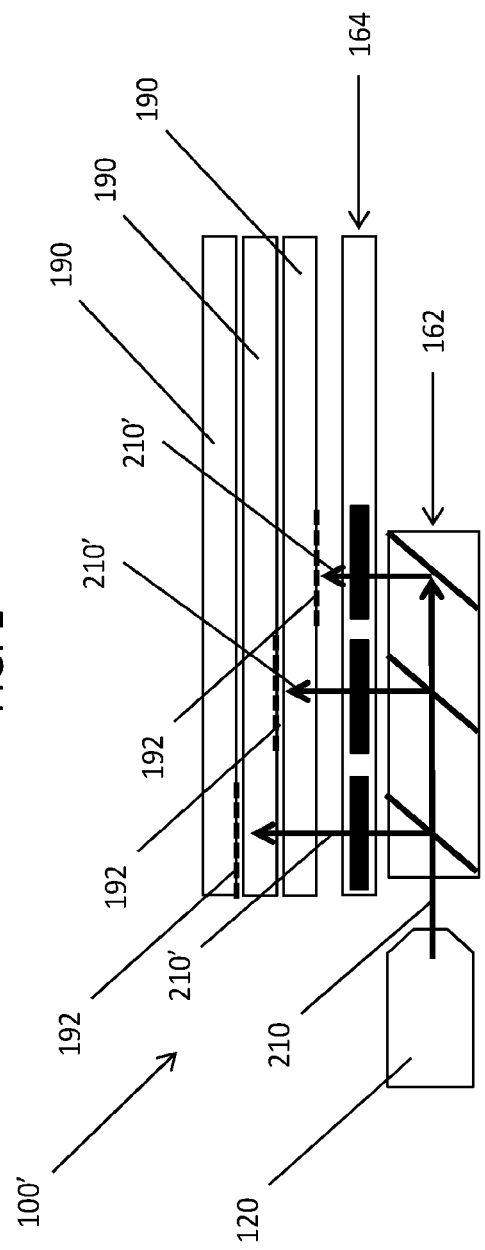

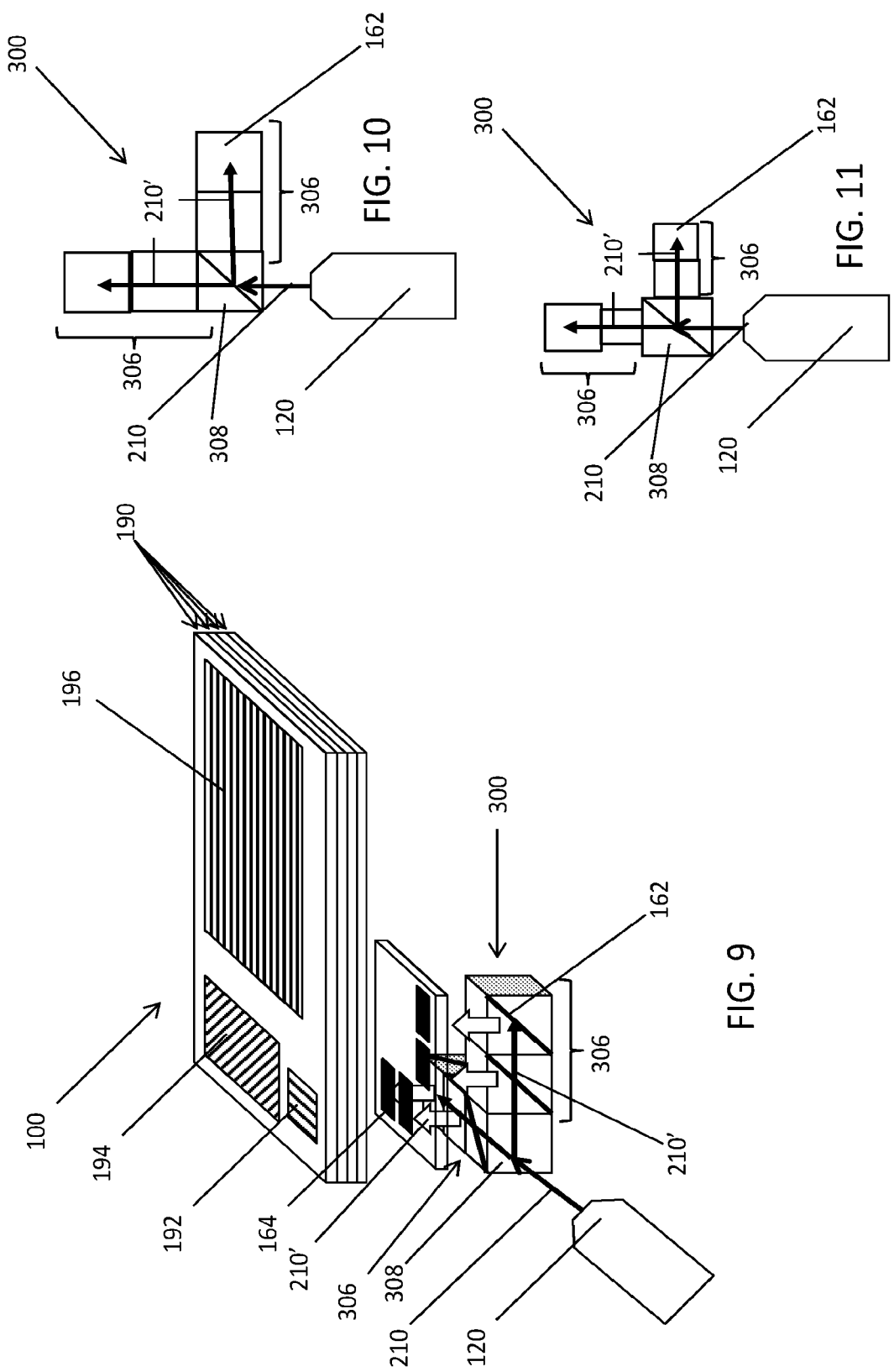

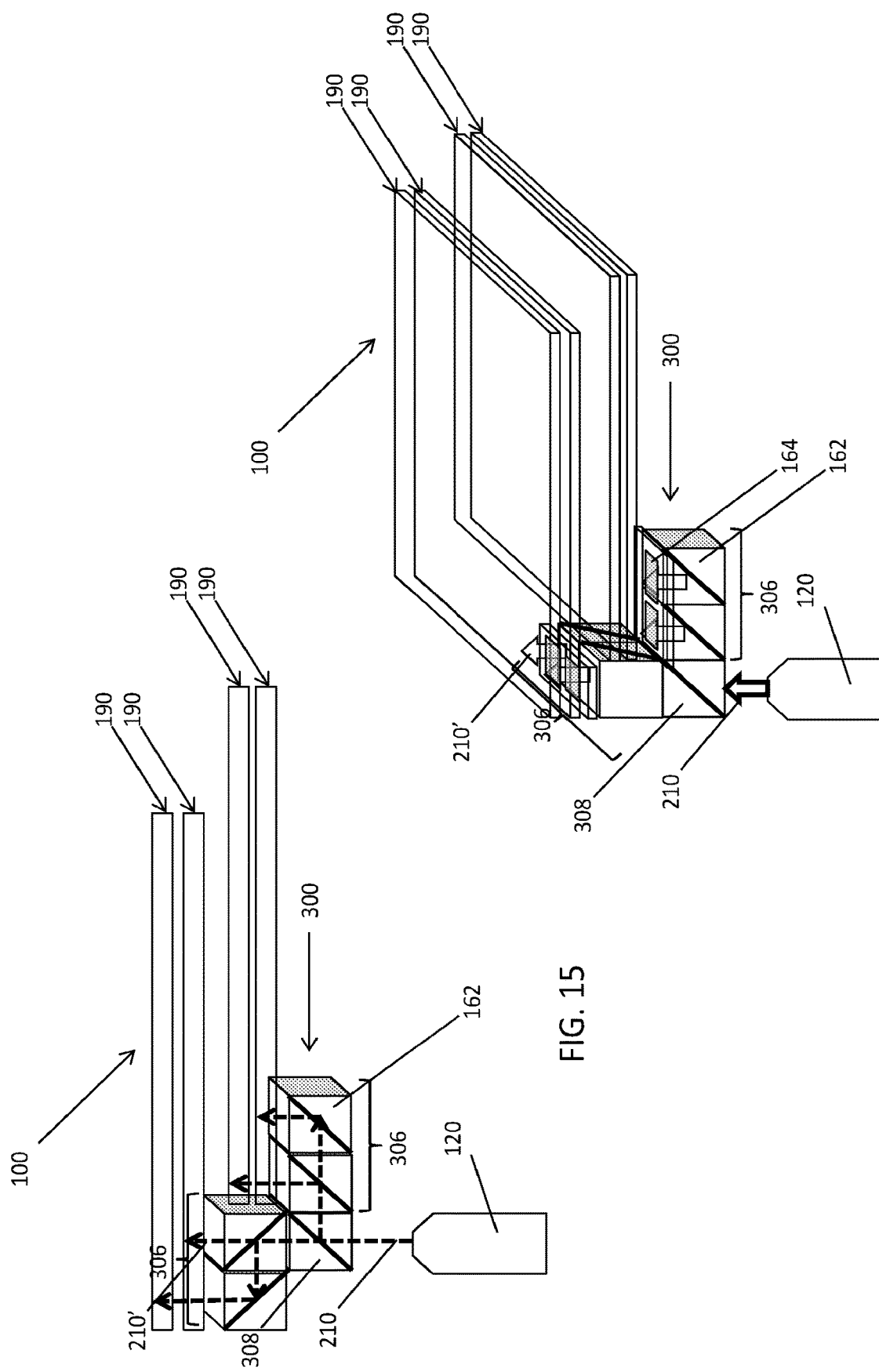

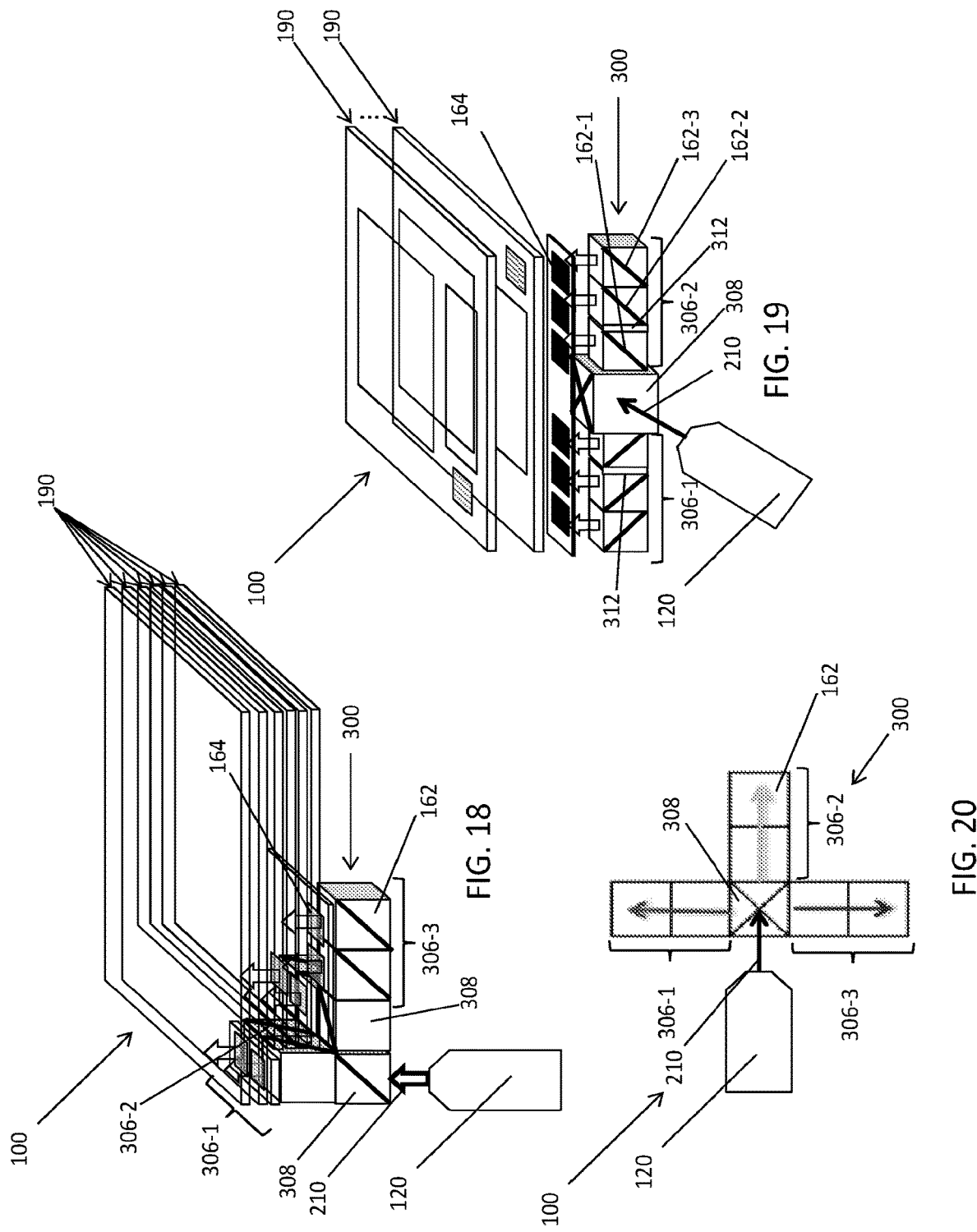

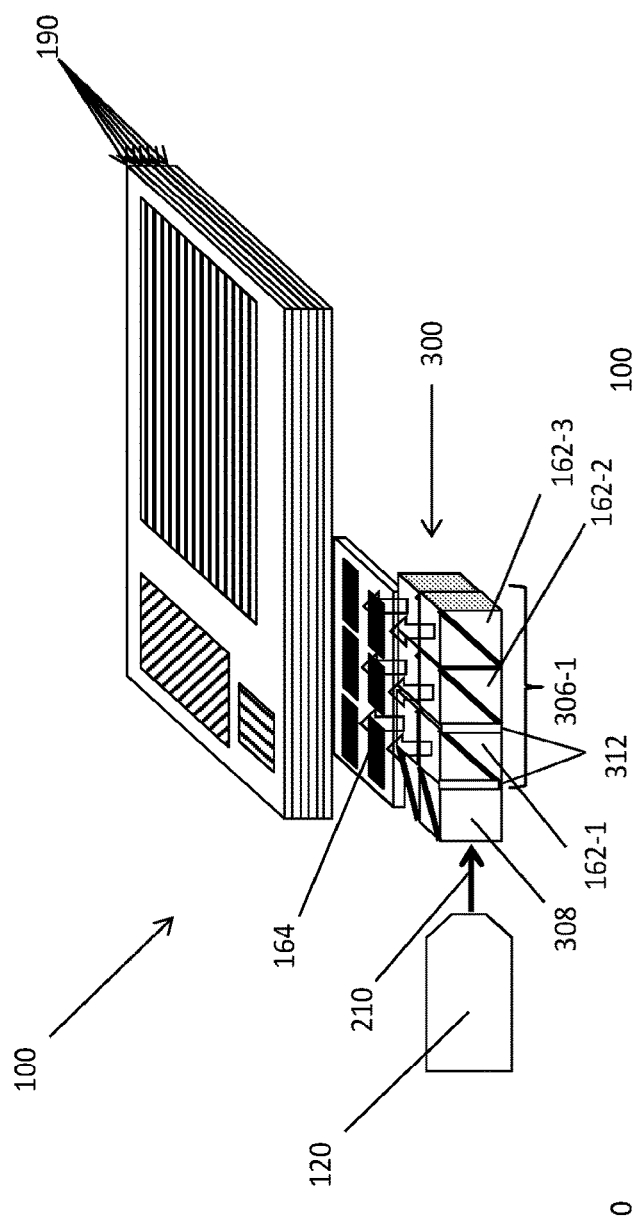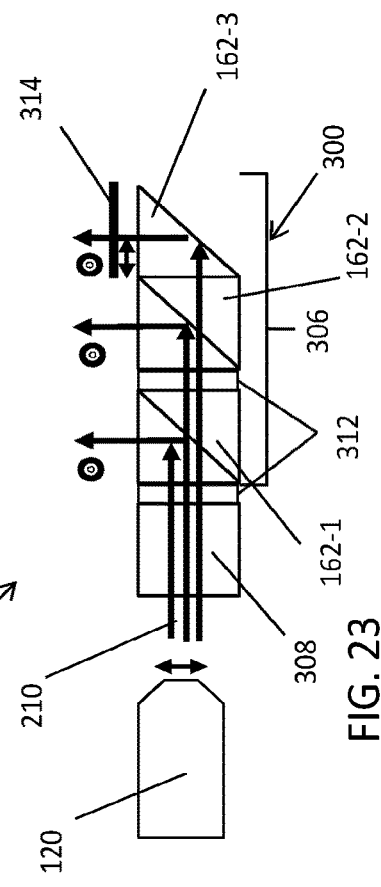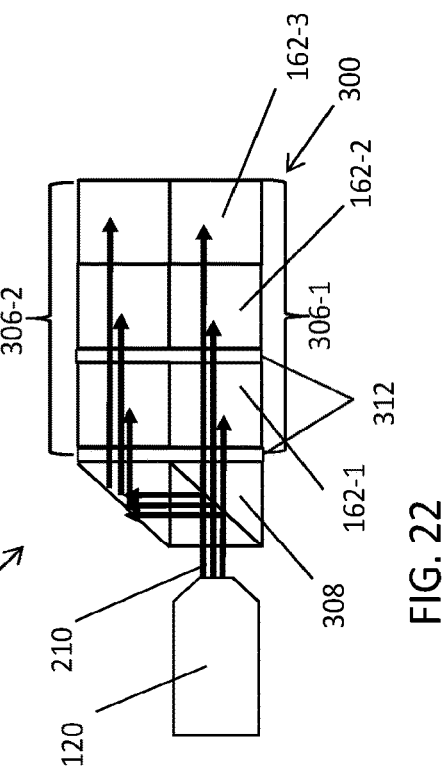
FIG. 21
FIG. 22
FIG. 23

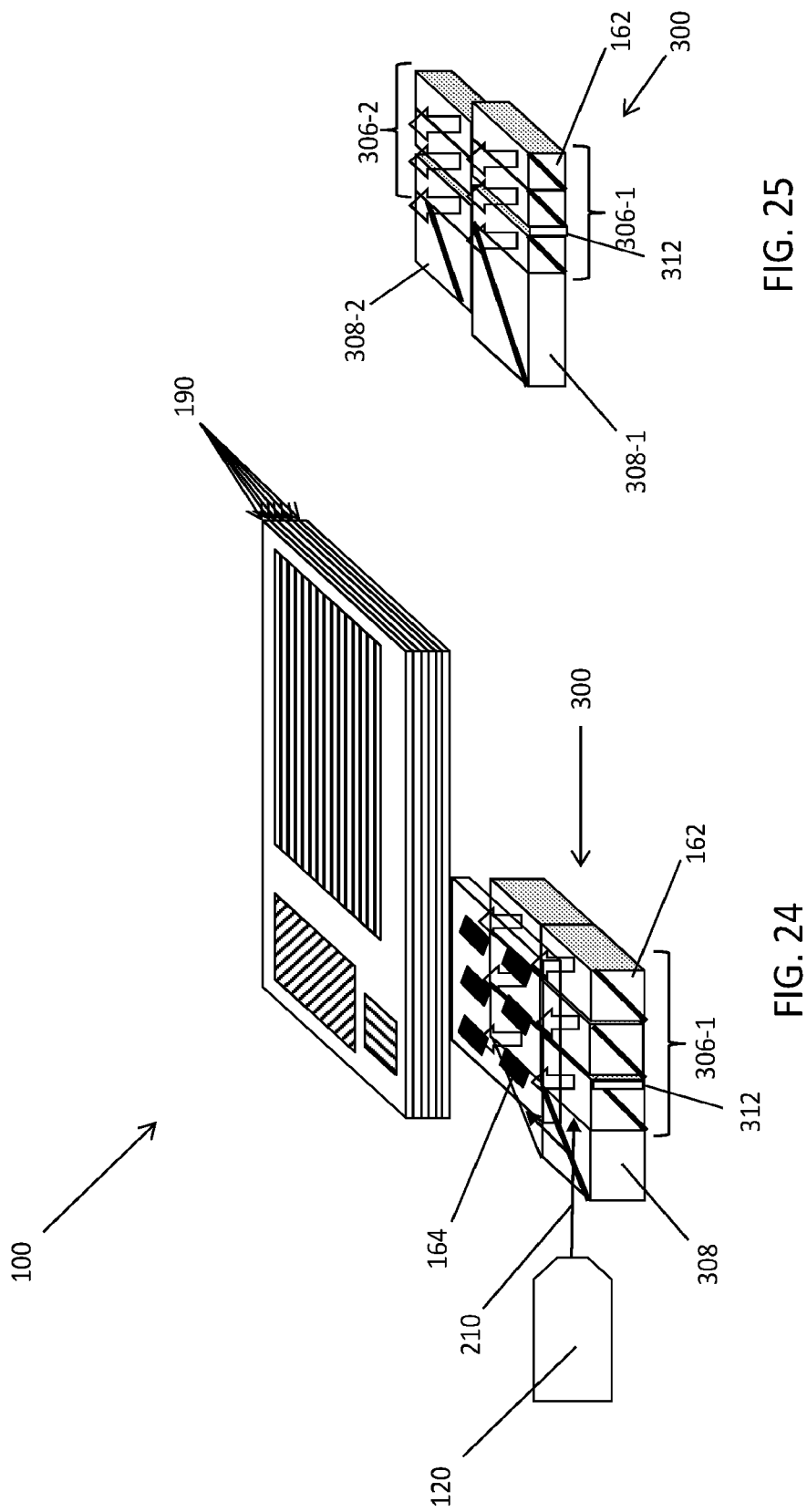

VIRTUAL AND AUGMENTED REALITY SYSTEMS AND METHODS

CROSS-REFERENCE TO RELATED APPLICATION(S)

The present application is a continuation of pending U.S. patent application Ser. No. 16/913,872, filed on Jun. 26, 2020 under entitled "VIRTUAL AND AUGMENTED REALITY SYSTEMS AND METHODS," which is a continuation of U.S. patent application Ser. No. 15/443,002, filed on Feb. 27, 2017 under entitled "VIRTUAL AND AUGMENTED REALITY SYSTEMS AND METHODS," which claims priority to U.S. Provisional Application Ser. No. 62/301,502, filed on Feb. 29, 2016 under entitled "VIRTUAL AND AUGMENTED REALITY SYSTEMS AND METHODS." This application is related to U.S. Utility patent application Ser. No. 14/331,218 filed on Jul. 14, 2014 under entitled "PLANAR WAVEGUIDE APPARATUS WITH DIFFRACTION ELEMENT(S) AND SYSTEM EMPLOYING SAME," is related to U.S. Utility patent application Ser. No. 14/555,585 filed on Nov. 27, 2014 under entitled "VIRTUAL AND AUGMENTED REALITY SYSTEMS AND METHODS," is related to U.S. Utility patent application Ser. No. 14/726,424 filed on May 29, 2015 under entitled "METHODS AND SYSTEMS FOR VIRTUAL AND AUGMENTED REALITY," is related to U.S. Utility patent application Ser. No. 14/726,429 filed on May 29, 2015 entitled "METHODS AND SYSTEMS FOR CREATING FOCAL PLANES IN VIRTUAL AND AUGMENTED REALITY," is related to U.S. Utility patent application Ser. No. 14/726,396 filed May 29, 2015 under entitled "METHODS AND SYSTEMS FOR DISPLAYING STEREOSCOPY WITH A FREEFORM OPTICAL SYSTEM WITH ADDRESSABLE FOCUS FOR VIRTUAL AND AUGMENTED REALITY," and is related to U.S. Provisional Patent Application Ser. No. 62/156,809 filed May 4, 2015 under entitled "SEPARATED PUPIL OPTICAL SYSTEMS FOR VIRTUAL AND AUGMENTED REALITY AND METHODS FOR DISPLAYING IMAGES USING SAME." The contents of the aforementioned patent applications are hereby expressly and fully incorporated by reference in their entirety, as though set forth in full.

BACKGROUND

Modern computing and display technologies have facilitated the development of systems for so called "virtual reality" or "augmented reality" experiences, wherein digitally reproduced images or portions thereof are presented to a user in a manner wherein they seem to be, or may be perceived as, real. A virtual reality, or "VR", scenario typically involves presentation of digital or virtual image information without transparency to other actual real-world visual input; an augmented reality, or "AR", scenario typically involves presentation of digital or virtual image information as an augmentation to visualization of the actual world around the user (i.e., transparency to other actual real-world visual input). Accordingly, AR scenarios involve presentation of digital or virtual image information with transparency to other actual real-world visual input. The human visual perception system is very complex, and producing a VR or AR technology that facilitates a comfortable, natural-feeling, rich presentation of virtual image elements amongst other virtual or real-world imagery elements is challenging.

The visualization center of the brain gains valuable perception information from the motion of both eyes and components thereof relative to each other. Vergence movements (i.e., rolling movements of the pupils toward or away from each other to converge the lines of sight of the eyes to fixate upon an object) of the two eyes relative to each other are closely associated with focusing (or "accommodation") of the lenses of the eyes. Under normal conditions, changing the focus of the lenses of the eyes, or accommodating the eyes, to focus upon an object at a different distance will automatically cause a matching change in vergence to the same distance, under a relationship known as the "accommodation-vergence reflex." Likewise, a change in vergence will trigger a matching change in accommodation, under normal conditions. Working against this reflex, as do most conventional stereoscopic AR or VR configurations, is known to produce eye fatigue, headaches, or other forms of discomfort in users.

Stereoscopic wearable glasses generally feature two displays for the left and right eyes that are configured to display images with slightly different element presentation such that a three-dimensional perspective is perceived by the human visual system. Such configurations have been found to be uncomfortable for many users due to a mismatch between vergence and accommodation ("vergence-accommodation conflict") which must be overcome to perceive the images in three dimensions. Indeed, some users are not able to tolerate stereoscopic configurations. These limitations apply to both AR and VR systems. Accordingly, most conventional AR and VR systems are not optimally suited for presenting a rich, binocular, three-dimensional experience in a manner that will be comfortable and maximally useful to the user, in part because prior systems fail to address some of the fundamental aspects of the human perception system, including the vergence-accommodation conflict.

AR and/or VR systems must also be capable of displaying virtual digital content at various perceived positions and distances relative to the user. The design of AR and/or VR systems also presents numerous other challenges, including the speed of the system in delivering virtual digital content, quality of virtual digital content, eye relief of the user (addressing the vergence-accommodation conflict), size and portability of the system, and other system and optical challenges.

One possible approach to address these problems (including the vergence-accommodation conflict) is to project light at the eyes of a user using a plurality of light-guiding optical elements such that the light and images rendered by the light appear to originate from multiple depth planes. The light-guiding optical elements are designed to in-couple virtual light corresponding to digital or virtual objects and propagate it by total internal reflection ("TIR"), then to out-couple the virtual light to display the digital or virtual objects to the user's eyes. In AR systems, the light-guiding optical elements are also designed be transparent to light from (e.g., reflecting off of) actual real-world objects. Therefore, portions of the light-guiding optical elements are designed to reflect virtual light for propagation via TIR while being transparent to real-world light from real-world objects in AR systems.

To implement multiple light-guiding optical element systems, light from one or more sources must be controllably distributed to each of the light-guiding optical element systems. One approach is to use a large number of optical elements (e.g., light sources, prisms, gratings, filters, scan-optics, beam splitters, mirrors, half-mirrors, shutters, eye pieces, etc.) to project images at a sufficiently large number (e.g., six) of depth planes. The problem with this approach is that using a large number of components in this manner necessarily requires a larger form factor than is desirable, and limits the degree to which the system size can be reduced. The large number of optical elements in these systems also results in a longer optical path, over which the light and the information contained therein will be degraded. These design issues result in cumbersome systems which are also power intensive. The systems and methods described herein are configured to address these challenges.

SUMMARY

Embodiments of the present invention are directed to devices, systems and methods for facilitating virtual reality and/or augmented reality interaction for one or more users.

In one embodiment, an imaging system includes a light source configured to generate a light beam. The system also includes first and second light guiding optical elements having respective first and second entry portions, and configured to propagate at least respective first and second portions of the light beam by total internal reflection. The system further includes a light distributor having a light distributor entry portion, a first exit portion, and a second exit portion. The light distributor is configured to direct the first and second portions of the light beam toward the first and second entry portions, respectively. The light distributor entry portion and the first exit portion are aligned along a first axis. The light distributor entry portion and the second exit portion are aligned along a second axis different from the first axis.

In one or more embodiments, the first and second light guiding optical elements and the light distributor are configured such that when the light beam interacts with the first exit portion, a first exit beamlet of the light beam exits the light distributor and enters the first light guiding optical element via the first entry portion, and when the light beam interacts with the second exit portion, a second exit beamlet of the light beam exits the light distributor and enters the second light guiding optical element via the second entry portion. The system may also include first and second shutters configured to selectively interrupt first and second light paths between first and second exit portions and first and second entry portions, respectively. The first and second light guiding optical elements may be disposed on opposite sides of the light distributor.

In one or more embodiments, the system also includes a focusing diffractive optical element disposed between the first and second light guiding optical elements. The focusing diffractive optical element may be configured to focus the second exit beamlet of the light beam toward the second entry portion of the second light guiding optical element.

In one or more embodiments, the first exit portion is a first beam splitter, and wherein the second exit portion is a second beam splitter. The first and second beam splitters may have different sizes. The first and second entry portions may have different sizes corresponding to the different sizes of the first and second beam splitters. The light distributor entry portion may be a receiving beam splitter configured to divide the light beam into first and second split beamlets respectively directed to the first and second beam splitters.

In one or more embodiments, the receiving beam splitter is a dichroic beam splitter. The first split beamlet may include green light and the second split beamlet includes red and blue light.

In one or more embodiments, the receiving beam splitter is a polarizing beam splitter, and wherein the light beam comprises polarized light. The polarized light may include green light. The light distributor may also have a retardation filter configured to change a polarization angle of a portion of the light beam. The portion of the light beam may include blue light.

In one or more embodiments, the receiving beam splitter is an X-cube beam splitter.

In one or more embodiments, the system also includes a third beam splitter disposed along the first axis such that the first beam splitter is between the light distributor beam splitter and the third beam splitter. The first beam splitter may be a dichroic beam splitter configured to divide the light beam into first and second split beamlets. The first and third beam splitters may be configured such that the first split beamlet is directed toward the first entry portion and the second split beamlet is directed toward the third beam splitter. The first split beamlet may include green light and the second split beamlet may include red and blue light.

In one or more embodiments, the first beam splitter is a polarizing beam splitter, and wherein the light beam comprises polarized light. The polarized light may include green light. The light distributor may also have a retardation filter configured to change a polarization angle of a portion of the light beam. The portion of the light beam may include blue light.

In another embodiment, an imaging system includes a light source configured to generate a light beam. The system also includes a first light guiding optical element having a first entry portion and configured to propagate at least a first portion of the light beam by total internal reflection. The system further includes a second light guiding optical element having a second entry portion and configured to propagate at least a second portion of the light beam by total internal reflection. Moreover, the system includes a light distributor having a light distributor entry portion, a first exit portion and a second exit portion, and configured to direct at least portions of the light beam into the first and second light guiding optical elements. The light distributor entry portion is disposed between the first and second exit portions.

In one or more embodiments, the light distributor entry portion is a dichroic beam splitter. The light distributor entry portion may be an X-cube beam splitter.

In still another embodiment, an imaging system includes a light source configured to generate a light beam. The system also includes a first light guiding optical element having a first entry portion and configured to propagate at least a first portion of the light beam by total internal reflection. The system further includes a second light guiding optical element having a second entry portion and configured to propagate at least a second portion of the light beam by total internal reflection. Moreover, the system includes a light distributor having a first out-coupling grating and a second out-coupling grating. The first and second light guiding optical elements and the light distributor are configured such that when the light beam interacts with the first out-coupling grating, a first exit beamlet of the light beam exits the light distributor and enters the first light guiding optical element via the first entry portion, and when the light beam interacts with the second out-coupling grating, a second exit beamlet of the light beam exits the light distributor and enters the second light guiding optical element via the second entry portion.

In one or more embodiments, the first out-coupling grating is a dynamic or static grating. The second out-coupling grating may be a dynamic or static grating.

In yet another embodiment, an imaging system includes a light source configured to generate a parent light beam. The system also includes a light guiding optical element configured to propagate at least a portion of the light beam by total internal reflection. The light source includes a beam splitter configured to divide the parent light beam into first and second light beams.

In one or more embodiments, the system also includes first and second shutters configured to selectively block first and second light beams, respectively.

In still another embodiment, an imaging system includes a light source configured to generate a parent light beam. The system also includes a first light guiding optical element configured to propagate a first portion of the light beam by total internal reflection. The system further includes a second light guiding optical element configured to propagate a second portion of the light beam by total internal reflection. The first portion of the light beam includes green light, and the second portion of the light beam includes red and blue light. The first and second light guiding optical elements are configured to direct the first and second portions of the light beam to first and second eyes of a user. The first and second light guiding optical elements are also configured to render first and second images at the same depth plane.

In yet another embodiment, an imaging system includes a light source configured to generate a parent light beam. The system also includes a first light guiding optical element having an entry portion and configured to propagate at least a portion of the light beam by total internal reflection. The system further includes a second light guiding optical element. Moreover, the system includes a reflective coating disposed on a surface of the second light guiding optical element adjacent the first light guiding optical element. The reflective coating is configured to reflect light passing through the entry portion back at the entry portion.

Additional and other objects, features, and advantages of the invention are described in the detail description, figures and claims.

BRIEF DESCRIPTION OF THE DRAWINGS

The drawings illustrate the design and utility of various embodiments of the present invention. It should be noted that the figures are not drawn to scale and that elements of similar structures or functions are represented by like reference numerals throughout the figures. In order to better appreciate how to obtain the above-recited and other advantages and objects of various embodiments of the invention, a more detailed description of the present inventions briefly described above will be rendered by reference to specific embodiments thereof, which are illustrated in the accompanying drawings. Understanding that these drawings depict only typical embodiments of the invention and are not therefore to be considered limiting of its scope, the invention will be described and explained with additional specificity and detail through the use of the accompanying drawings in which:

FIGS. 1 to 3 are detailed schematic views of various optical systems;

FIG. 9 is a detailed perspective view of an optical system according to one embodiment;

FIG. 10 is a top view of the light distributor of the optical system depicted in FIG. 9;

FIG. 11 is a top view of a light distributor according to one embodiment;

FIGS. 13 to 15 are detailed schematic views of optical systems according to two embodiments;

FIG. 16 is a detailed perspective view of an optical system according to one embodiment;

FIGS. 18 and 19 are detailed schematic views of optical systems according to two embodiments;

FIG. 20 is a top view of a light distributor according to one embodiment;

FIGS. 21, 22 and 23 are detailed perspective, top, and side views of an optical system according to one embodiment;

FIG. 24 is a detailed perspective view of an optical system according to one embodiment;

FIG. 25 is a detailed perspective view of a light distributor according to one embodiment;

DETAILED DESCRIPTION

Figure 3:
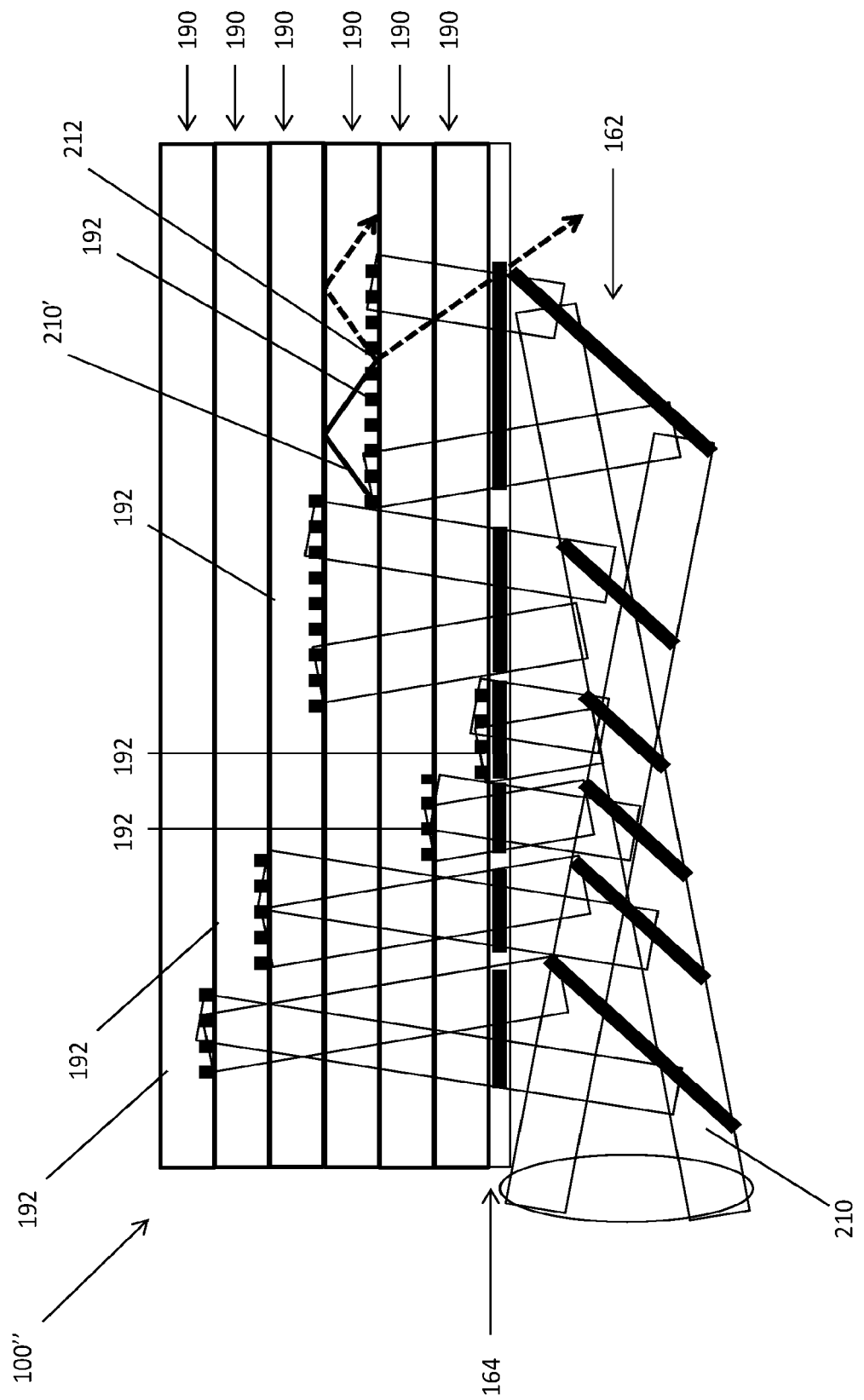

Various embodiments of the invention are directed to systems, methods, and articles of manufacture for implementing optical systems in a single embodiment or in multiple embodiments. Other objects, features, and advantages of the invention are described in the detailed description, figures, and claims.

Various embodiments will now be described in detail with reference to the drawings, which are provided as illustrative examples of the invention so as to enable those skilled in the art to practice the invention. Notably, the figures and the examples below are not meant to limit the scope of the present invention. Where certain elements of the present invention may be partially or fully implemented using known components (or methods or processes), only those portions of such known components (or methods or processes) that are necessary for an understanding of the present invention will be described, and the detailed descriptions of other portions of such known components (or methods or processes) will be omitted so as not to obscure the invention. Further, various embodiments encompass present and future known equivalents to the components referred to herein by way of illustration.

The optical systems may be implemented independently of AR systems, but many embodiments below are described in relation to AR systems for illustrative purposes only.

Summary of Problem and Solution

One type of optical system for generating images at various depths includes numerous optical components (e.g., light sources, prisms, gratings, filters, scan-optics, beam splitters, mirrors, half-mirrors, shutters, eye pieces, etc.) that increase in number, thereby increasing the complexity, size and cost of AR and VR systems, as the quality of the 3D experience/scenario (e.g., the number of imaging planes) and the quality of images (e.g., the number of image colors) increases. The increasing size of optical systems with increasing 3D scenario/image quality imposes a limit on the size of AR and VR systems resulting in cumbersome systems with reduced efficiency.

The following disclosure describes various embodiments of systems and methods for creating 3D perception using multiple-plane focus optical elements that address the problem, by providing optical systems with fewer components and increased efficiency. In particular, the systems described herein utilize various light distribution systems, including various system components and designs, to reduce the size of optical systems while selectively distributing light from one or more light sources to the plurality of light-guiding optical elements ("LOEs"; e.g., planar waveguides) required to render high quality AR and VR scenarios.

Illustrative Optical Systems

Before describing the details of embodiments of the light distribution systems, this disclosure will now provide a brief description of illustrative optical systems. While the embodiments are can be used with any optical system, specific systems (e.g., AR systems) are described to illustrate the technologies underlying the embodiments.

One possible approach to implementing an AR system uses a plurality of volume phase holograms, surface-relief holograms, or light-guiding optical elements that are embedded with depth plane information to generate images that appear to originate from respective depth planes. In other words, a diffraction pattern, or diffractive optical element ("DOE") may be embedded within or imprinted upon an LOE such that as collimated light (light beams with substantially planar wavefronts) is substantially totally internally reflected along the LOE, it intersects the diffraction pattern at multiple locations and exits toward the user's eye. The DOEs are configured so that light exiting therethrough from an LOE are verged so that they appear to originate from a particular depth plane. The collimated light may be generated using an optical condensing lens (a "condenser").

For example, a first LOE may be configured to deliver collimated light to the eye that appears to originate from the optical infinity depth plane (0 diopters). Another LOE may be configured to deliver collimated light that appears to originate from a distance of 2 meters (½ diopter). Yet another LOE may be configured to deliver collimated light that appears to originate from a distance of 1 meter (1 diopter). By using a stacked LOE assembly, it can be appreciated that multiple depth planes may be created, with each LOE configured to display images that appear to originate from a particular depth plane. It should be appreciated that the stack may include any number of LOEs. However, at least N stacked LOEs are required to generate N depth planes. Further, N, 2N or 3N stacked LOEs may be used to generate RGB colored images at N depth planes.

In order to present 3D virtual content to the user, the augmented reality (AR) system projects images of the virtual content into the user's eye so that they appear to originate from various depth planes in the Z direction (i.e., orthogonally away from the user's eye). In other words, the virtual content may not only change in the X and Y directions (i.e., in a 2D plane orthogonal to a central visual axis of the user's eye), but it may also appear to change in the Z direction such that the user may perceive an object to be very close or at an infinite distance or any distance in between. In other embodiments, the user may perceive multiple objects simultaneously at different depth planes. For example, the user may see a virtual dragon appear from infinity and run towards the user. Alternatively, the user may simultaneously see a virtual bird at a distance of 3 meters away from the user and a virtual coffee cup at arm's length (about 1 meter) from the user.

Figure 4:
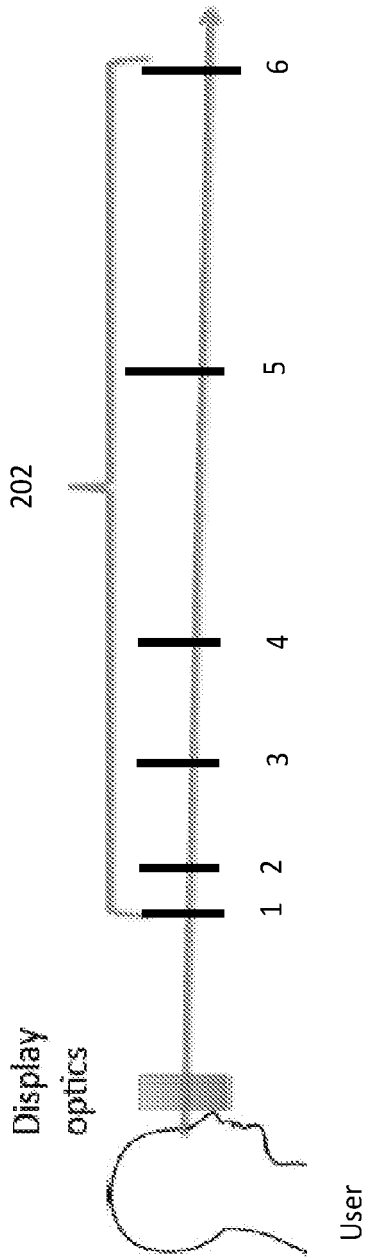
FIG. 4 is a diagram depicting the focal planes of an optical system.

Multiple-plane focus systems create a perception of variable depth by projecting images on some or all of a plurality of depth planes located at respective fixed distances in the Z direction from the user's eye. Referring now to FIG. 4, it should be appreciated that multiple-plane focus systems typically display frames at fixed depth planes 202 (e.g., the six depth planes 202 shown in FIG. 4). Although AR systems can include any number of depth planes 202, one exemplary multiple-plane focus system has six fixed depth planes 202 in the Z direction. In generating virtual content one or more of the six depth planes 202, 3D perception is created such that the user perceives one or more virtual objects at varying distances from the user's eye. Given that the human eye is more sensitive to objects that are closer in distance than objects that appear to be far away, more depth planes 202 are generated closer to the eye, as shown in FIG. 4. In other embodiments, the depth planes 202 may be placed at equal distances away from each other.

Depth plane positions 202 are typically measured in diopters, which is a unit of optical power equal to the inverse of the focal length measured in meters. For example, in one embodiment, depth plane 1 may be ⅓ diopters away, depth plane 2 may be 0.3 diopters away, depth plane 3 may be 0.2 diopters away, depth plane 4 may be 0.15 diopters away, depth plane 5 may be 0.1 diopters away, and depth plane 6 may represent infinity (i.e., 0 diopters away). It should be appreciated that other embodiments may generate depth planes 202 at other distances/diopters. Thus, in generating virtual content at strategically placed depth planes 202, the user is able to perceive virtual objects in three dimensions. For example, the user may perceive a first virtual object as being close to him when displayed in depth plane 1, while another virtual object appears at infinity at depth plane 6. Alternatively, the virtual object may first be displayed at depth plane 6, then depth plane 5, and so on until the virtual object appears very close to the user. It should be appreciated that the above examples are significantly simplified for illustrative purposes. In another embodiment, all six depth planes may be concentrated on a particular focal distance away from the user. For example, if the virtual content to be displayed is a coffee cup half a meter away from the user, all six depth planes could be generated at various cross-sections of the coffee cup, giving the user a highly granulated 3D view of the coffee cup.

In one embodiment, the AR system may work as a multiple-plane focus system. In other words, all six LOEs may be illuminated simultaneously, such that images appearing to originate from six fixed depth planes are generated in rapid succession with the light sources rapidly conveying image information to LOE 1, then LOE 2, then LOE 3 and so on. For example, a portion of the desired image, comprising an image of the sky at optical infinity may be injected at time 1 and the LOE 1090 retaining collimation of light (e.g., depth plane 6 from FIG. 4) may be utilized. Then an image of a closer tree branch may be injected at time 2 and an LOE 1090 configured to create an image appearing to originate from a depth plane 10 meters away (e.g., depth plane 5 from FIG. 4) may be utilized; then an image of a pen may be injected at time 3 and an LOE 1090 configured to create an image appearing to originate from a depth plane 1 meter away may be utilized. This type of paradigm can be repeated in rapid time sequential (e.g., at 360 Hz) fashion such that the user's eye and brain (e.g., visual cortex) perceives the input to be all part of the same image.

AR systems are required to project images (i.e., by diverging or converging light beams) that appear to originate from various locations along the Z axis (i.e., depth planes) to generate images for a 3D experience. As used in this application, light beams including, but are not limited to, directional projections of light energy (including visible and invisible light energy) radiating from a light source. Generating images that appear to originate from various depth planes conforms the vergence and accommodation of the user's eye for that image, and minimizes or eliminates vergence-accommodation conflict.

FIG. 1 depicts a basic optical system 100 for projecting images at a single depth plane. The system 100 includes a light source 120 and an LOE 190 having a diffractive optical element (not shown) and an in-coupling grating 192 ("ICG") associated therewith. The light source 120 can be any suitable imaging light source, including, but not limited to DLP, LCOS, LCD and Fiber Scanned Display. Such light sources can be used with any of the systems 100 described herein. The diffractive optical elements may be of any type, including volumetric or surface relief. The ICG 192 can be a reflection-mode aluminized portion of the LOE 190. Alternatively, the ICG 192 can be a transmissive diffractive portion of the LOE 190. When the system 100 is in use, a virtual light beam 210 from the light source 120, enters the LOE 190 via the ICG 192 and propagates along the LOE 190 by substantially total internal reflection ("TIR") for display to an eye of a user. The light beam 210 is virtual because it encodes an image or a portion thereof as directed by the system 100. It is understood that although only one beam is illustrated in FIG. 1, a multitude of beams, which encode an image, may enter LOE 190 from a wide range of angles through the same ICG 192. A light beam "entering" or being "admitted" into an LOE includes, but is not limited to, the light beam interacting with the LOE so as to propagate along the LOE by substantially TIR. The system 100 depicted in FIG. 1 can include various light sources 120 (e.g., LEDs, OLEDs, lasers, and masked broad-area/broad-band emitters). Light from the light source 120 may also be delivered to the LOE 190 via fiber optic cables (not shown).

FIG. 2 depicts another optical system 100', which includes a light source 120, and respective pluralities (e.g., three) of LOEs 190, and in-coupling gratings 192. The optical system 100' also includes three beam splitters 162 (to direct light to the respective LOEs) and three shutters 164 (to control when the LOEs are illuminated). The shutters 164 can be any suitable optical shutter, including, but not limited to, liquid crystal shutters. The beam splitters 162 and shutters 164 are depicted schematically in FIG. 2 without specifying a configuration to illustrate the function of optical system 100'. The embodiments described below include specific optical element configurations that address various issues with optical systems.

When the system 100' is in use, the virtual light beam 210 from the light source 120 is split into three virtual light sub-beams/beamlets 210' by the three-beam splitters 162. The three beam splitters also redirect the beamlets toward respective in-coupling gratings 192. After the beamlets enter the LOEs 190 through the respective in-coupling gratings 192, they propagate along the LOEs 190 by substantially TIR (not shown) where they interact with additional optical structures resulting in display to an eye of a user. The surface of in-coupling gratings 192 on the far side of the optical path can be coated with an opaque material (e.g., aluminum) to prevent light from passing through the in-coupling gratings 192 to the next LOE 190. The beam splitters 162 can be combined with wavelength filters to generate red, green and blue beamlets. Three single-color LOEs 190 are required to display a color image at a single depth plane. Alternatively, LOEs 190 may each present a portion of a larger, single depth-plane image area angularly displaced laterally within the user's field of view, either of like colors, or different colors ("tiled field of view"). While all three virtual light beam lets 210' are depicted as passing through respective shutters 164, typically only one beamlet 210' is selectively allowed to pass through a corresponding shutter 164 at any one time. In this way, the system 100' can coordinate image information encoded by the beam 210 and beam let 210' with the LOE 190 through which the beam let 210 and the image information encoded therein will be delivered to the user's eye.

FIG. 3 depicts still another optical system 100", having respective pluralities (e.g., six) of beam splitters 162, shutters 164, ICGs 192, and LOEs 190. As explained above during the discussion of FIG. 2, three single-color LOEs 190 are required to display a color image at a single depth plane. Therefore, the six LOEs 190 of this system 100" are able to display color images at two depth planes. The beam splitters 162 in optical system 100" have different sizes. The shutters 164 in optical system 100" have different sizes corresponding to the size of the respective beam splitters 162.

The ICGs 192 in optical system 100" have different sizes corresponding to the size of the respective beam splitters 162 and the length of the beam path between the beam splitters 162 and their respective ICGs 192. The longer the distance beam path between the beam splitters 162 and their respective ICGs 192, the more the beams diverge and require a larger ICGs 192 to in-couple the light. As shown in FIG. 3, larger beam splitters 162 also require larger ICGs 192. While larger beam splitters 162 allow light sources 120 to have larger scan angles, and thus larger fields of view ("FOVs"), they also require larger ICGs 192, which are susceptible to a "second encounter problem."

The Second Encounter Problem

The second encounter problem is depicted in FIG. 3. The virtual light beam let 210' depicted in FIG. 3 enters an LOE 190 through an ICG 192. The size of ICG 192 is such that as the beam let 210' propagates through the LOE 190 by TIR, the beam let 210' encounters the ICG 192 at a second location 212. This second encounter allows unintended out-coupling of light from the LOE 190, thereby decreasing the intensity of the light propagated along the LOE 190. Accordingly, increasing the size of an ICG 192 such that a beam let 210' has a second encounter with the ICG 192 during TIR will decrease the efficiency of the optical system 100" for select LOEs 190. Embodiments addressing the second encounter problem are described below.

While this problem is described as a "second" encounter problem, larger ICGs 192 can cause a series of repeat encounters that would further decrease the optical efficiency. Further, as shown in FIGS. 1-4, as the number of depth planes, field tiles, or colors generated increases (e.g., with increased AR scenario quality), the numbers of LOEs 190 and ICGs 192 increases. For example, a single RGB color depth plane requires at least three single-color LOEs 190 with three ICGs 192. As a result, the opportunity for inadvertent in-coupling of real-world light at these optical elements also increases. Moreover, real-world light can be in-coupled all along an LOE 190, including at out-coupling gratings (not shown). Thus the increasing number of optical elements required to generate an acceptable AR scenario exacerbates the second encounter problem for the system 100.

Pupil Expanders

Figure 5:
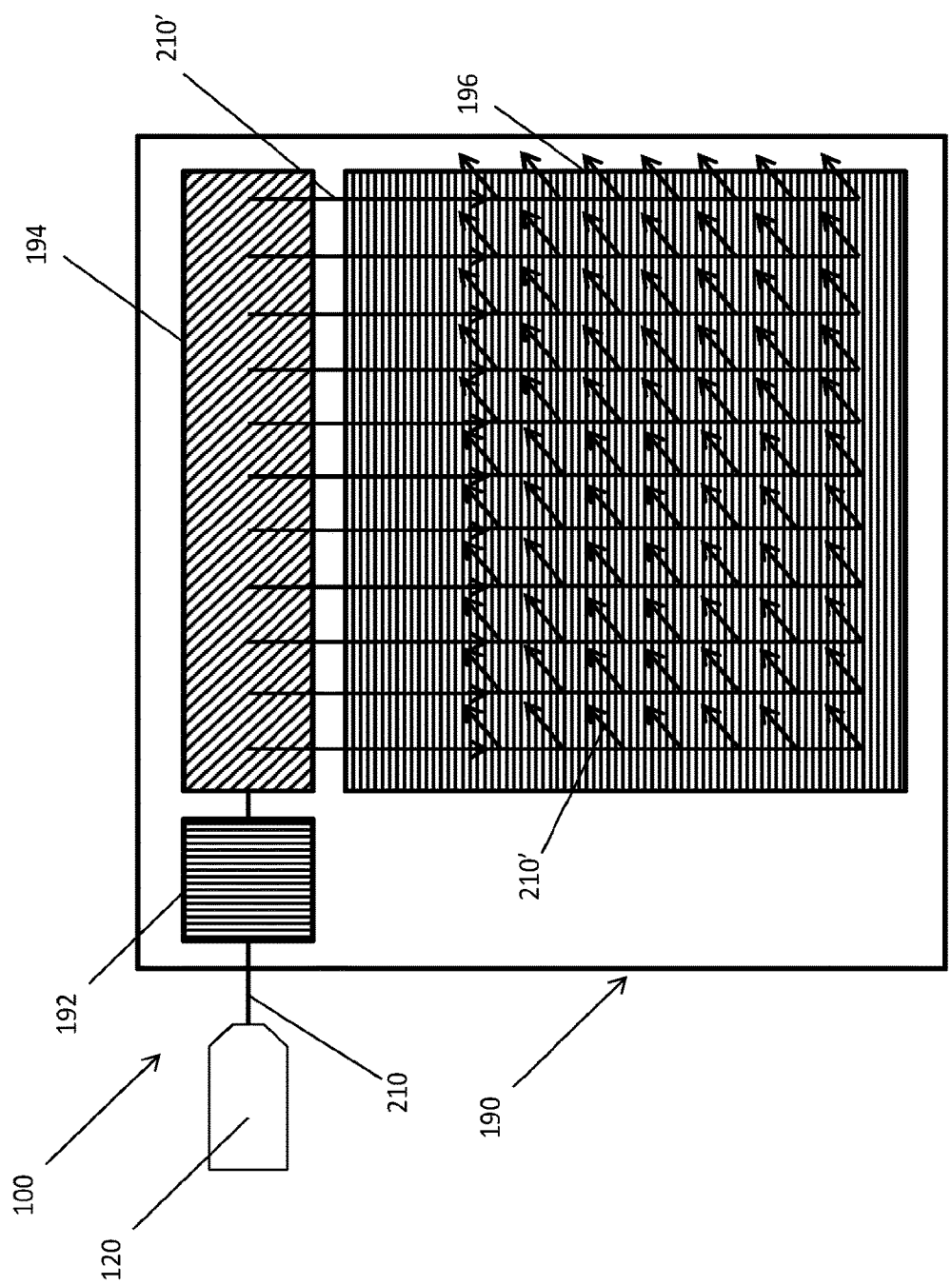
FIG. 5 is a detailed schematic view of a light-guiding optical element of an optical system.

As shown in FIG. 5, portions of the LOEs 190 described above can function as exit pupil expanders 196 ("EPE") to increase the numerical aperture of a light source 120 in the Y direction, thereby increasing the resolution of the system 100. Since the light source 120 produces light of a small diameter/spot size, the EPE 196 expands the apparent size of the pupil of light exiting from the LOE 190 to increase the system resolution. The AR system 100 may further comprise an orthogonal pupil expander 194 ("OPE") in addition to an EPE 196 to expand the light in both the X (OPE) and Y (EPE) directions. More details about the EPEs 196 and OPEs 194 are described in the above-referenced U.S. Utility patent application Ser. No. 14/555,585 and U.S. Utility patent application Ser. No. 14/726,424, the contents of which have been previously incorporated by reference.

FIG. 5 depicts an LOE 190 having an ICG 192, an OPE 194 and an EPE 196. FIG. 5 depicts the LOE 190 from a top view that is similar to the view from a user's eyes. The ICG 192, OPE 194, and EPE 196 may be any type of DOE, including volumetric or surface relief.

The ICG 192 is a DOE (e.g., a linear grating) that is configured to admit a virtual light beam 210 from a light source 120 for propagation by TIR. In the system 100 depicted in FIG. 5, the light source 120 is disposed to the side of the LOE 190.

The OPE 194 is a DOE (e.g., a linear grating) that is slanted in the lateral plane (i.e., perpendicular to the light path) such that a virtual light beam 210 that is propagating through the system 100 will be deflected by 90 degrees laterally. The OPE 194 is also partially transparent and partially reflective along the light path, so that the light beam 210 partially passes through the OPE 194 to form multiple (e.g., eleven) beamlets 210'. In the depicted system 100, the light path is along an X axis, and the OPE 194 configured to bend the beamlets 210' to the Y axis.

The EPE 196 is a DOE (e.g., a linear grating) that is slanted in a Z plane (i.e., normal to the X and Y directions) such that the beam lets 210' that are propagating through the system 100 will be deflected by 90 degrees in the Z plane and toward a user's eye. The EPE 196 is also partially transparent and partially reflective along the light path (the Y axis), so that the beam lets 210' partially pass through the EPE 196 to form multiple (e.g., seven) beam lets 210'. Only select beams 210 and beam lets 210' are labeled for clarity.

The OPE 194 and the EPE 196 are both also at least partially transparent along the Z axis to allow real-world light (e.g., reflecting off real-world objects) to pass through the OPE 194 and the EPE 196 in the Z direction to reach the user's eyes. For AR systems 100, the ICG 192 is at least partially transparent along the Z axis also at least partially transparent along the Z axis to admit real-world light. However, when the ICG 192, OPE 194, or the EPE 196 are transmissive diffractive portions of the LOE 190, they may unintentionally in-couple real-world light may into the LOE 190. As described above this unintentionally in-coupled real-world light may be out-coupled into the eyes of the user forming ghost artifacts.

Figure 6:
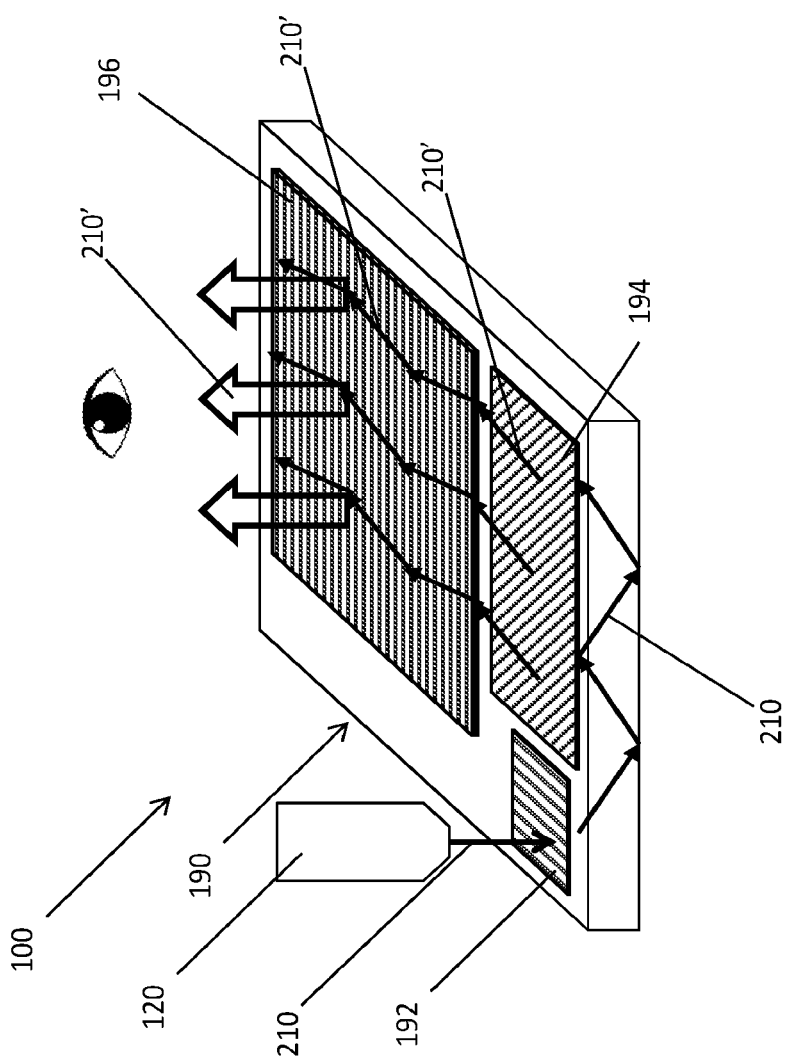
FIG. 6 is a detailed perspective view of a light-guiding optical element of an optical system.

FIG. 6 depicts another optical system 100 including an LOE 190 having an ICG 192, an OPE 194, and an EPE 196. The system 100 also includes a light source 120 configured to direct a virtual light beam 210 into the LOE 190 via the ICG 192. The light beam 210 is divided into beam lets 210' by the OPE 194 and the EPE 196 as described with respect to FIG. 5 above. Further, as the beam lets 210' propagate through the EPE 196, they also exit the LOE 190 via the EPE 196 toward the user's eye. Only select beams 210 and beamlets 210' are labeled for clarity.

Multiple Depth Optical Systems

Figure 7:
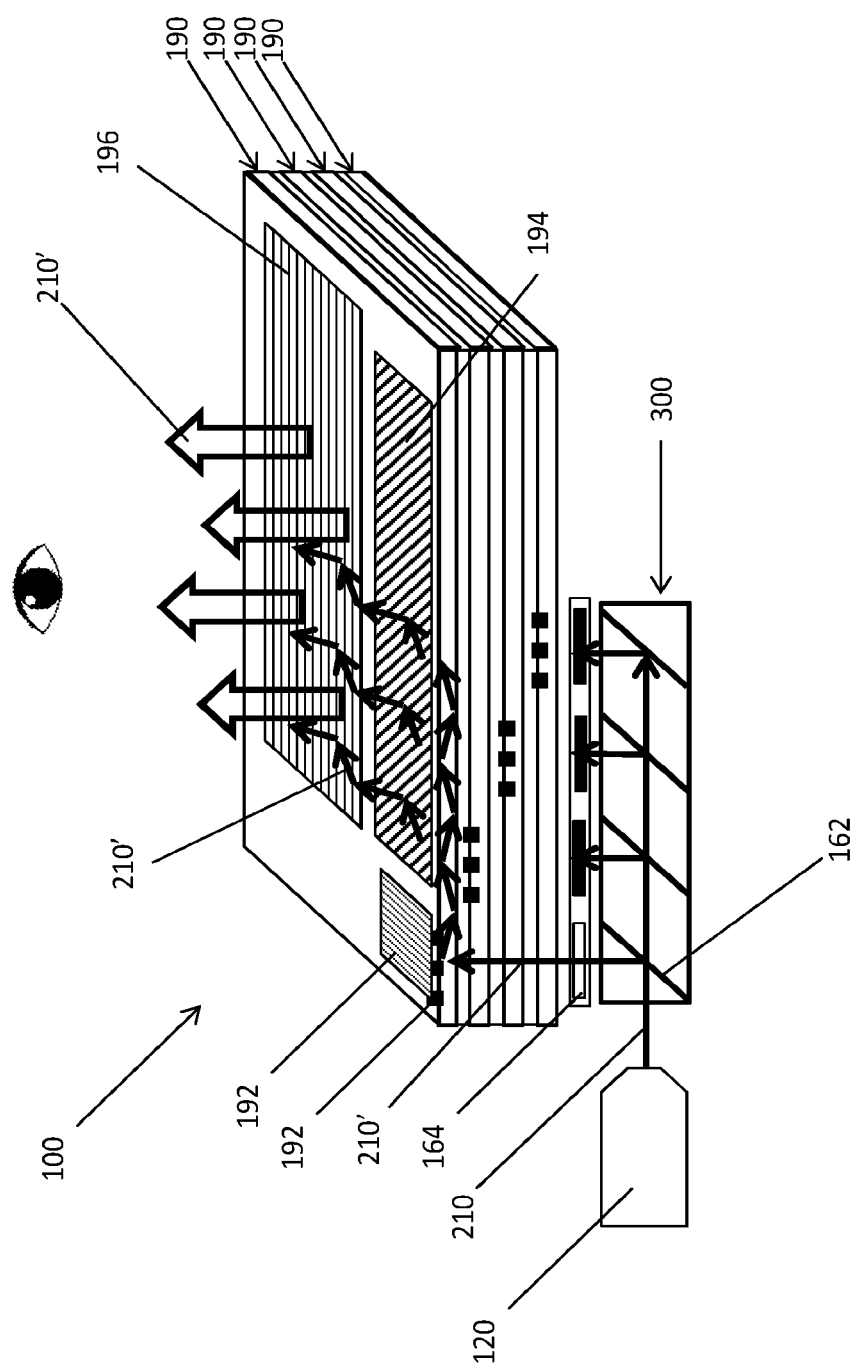
FIG. 7 is a detailed schematic view of an optical system.

FIG. 7 depicts an optical system 100 including a plurality (e.g., four) of LOEs 190, each having an ICG 192, an OPE 194, and an EPE 196. Each of the plurality of LOEs 190 can be configured to deliver light to a user's eye such that the light has a particular color and/or appears to originate from a particular depth plane. The system 100 also includes a light source 120 configured to direct a virtual light beam 210 into a light distributor 300. The light distributor 300 is configured to divide the light beam 210 into a plurality (e.g., four) of beam lets 210' and to direct the beam lets 210' toward respective shutters 164 and respective ICGs 192 behind the shutters 164.

The light distributor 300 has a plurality (e.g., four) of beam splitters 162. The beam splitters 162 can be of any type, including, but not limited to, partially reflective beam splitters, dichroic beam splitters (e.g., dichroic mirror prisms), and/or polarizing beam splitters, such as wire-grid beam splitters. In the system 100 depicted in FIG. 7, only one shutter 164 is open to allow only one beam let 210' to address its respective ICG 192 and propagate through its respective LOE 190 by TIR. The beam splitters 162 and shutters 164 are depicted schematically in FIG. 7 without specifying a configuration to illustrate the function of optical system 100. The embodiments described below include specific optical element configurations that address various issues with optical systems.

The beamlet 210' is further divided into beamlets 210' by the OPE 194 and the EPE 196 as described above with respect to FIG. 6. The beam lets 210' also exit the LOE 190 via the EPE 196 toward the user's eye as described above. Only select duplicate system components, beams 210 and beamlets 210' are labeled for clarity.

Further, the ICG 192 is depicted on the top surface of the top LOE 190 and on the sides of each of the four LOEs 190 in the system 100. This side view demonstrates that the ICG 192 of each of the stack of LOEs 190 is disposed in a different location on the face of its LOE 190 to allow each ICG 192 in the stack of LOEs 190 to be addressed by a separate beam splitter 162 in the distribution device. Because each beam splitter 162 is separated by its respective ICG 192 by a controllable shutter, the system 100 can select one LOE 190 to be illuminated by a beam let 210' at a particular time. While the locations of the schematically illustrated shutters 164 and ICGs 192 appear to vary only along the X axis, the locations can vary along any spatial axis (X, Y, or Z).

Figure 8:
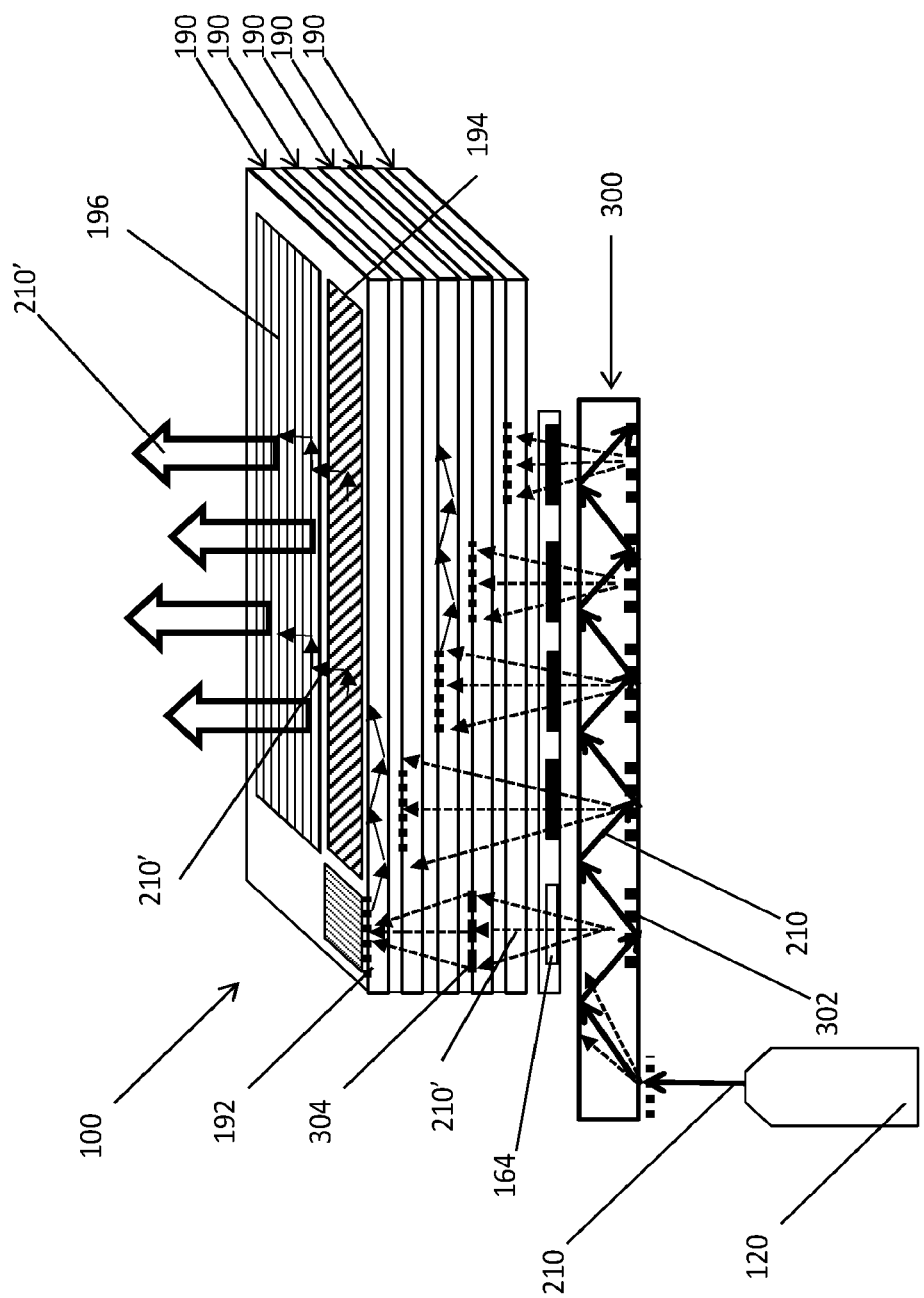
FIG. 8 is a detailed schematic view of an optical system according to one embodiment.

FIG. 8 depicts an optical system 100 according to one embodiment, which includes a plurality (e.g., five) of LOEs 190, each having an ICG 192, an OPE 194, and an EPE 196. Each of the plurality of LOEs 190 can be configured to deliver light to a user's eye such that the light has a particular color and/or appears to originate from a particular depth plane. The system 100 also includes a light source 120 configured to direct a virtual light beam 210 into a light distributor 300. The light distributor 300 is configured to divide the light beam 210 into a plurality (e.g., five) of beamlets 210' and to direct the beam lets 210' toward respective shutters 164 and respective ICGs 192 behind the shutters 164.

The light distributor 300 depicted in FIG. 8 is an integral optical element having an ICG 192 and a plurality (e.g., five) of out-coupling gratings 302 ("OCG"). The ICG 192 is configured to in-couple a virtual light beam 210 from the light source 120 such that it propagates by substantially TIR in the light distributor 300. The OCGs can be dynamic gratings (e.g., PDLC) or static gratings. The OCGs 302 are disposed serially along the longitudinal axis and TIR light path of the light distributor 300. Each of the OCGs is configured to direct a portion (e.g., a beamlet 210') of the light beam 210 near a tangent to the light distributor 300 and out of the light distributor 300 and toward a respective ICG 192 in a respective LOE 190. Another portion of the beam 210 reflects off of the OCG 302 at a more oblique angle, and continues to propagate through the light distributor by substantially TIR. This other portion of the beam 210 interacts with the remaining plurality of OCGs 302, which correspond to each of the LOEs 190 in the system 100.

Like the system 100 depicted in FIG. 7, the system 100 depicted in FIG. 8 also includes a plurality (e.g., five) of shutters 164 separating the light distributor 300 from respective ICGs 192. While the locations of the schematically illustrated OCGs 302, shutters 164, and ICGs 192 appear to vary only along the X axis, the locations can vary along any spatial axis (X, Y, or Z).

As described above, the light distributor 300 is configured to divide the virtual light beam 210 into a plurality (e.g., five) of beam lets 210'. While each OCG 302 depicted in FIG. 8 redirects a beam let 210' toward an opposite side of the light distributor 300 for exit, an OCG 302 may also allow a beam let 210' to exit therethrough in other embodiments. In such embodiments, the OCGs 302 can be disposed on the surface of the light distributor adjacent the shutters 164 and LOEs 190. In the system 100 depicted in FIG. 8, only one shutter 164 is open to allow only one beamlet 210' to address its respective ICG 192 and propagate through its respective LOE 190 by TIR. However, the other beam lets 210' are depicted as passing through their respective closed shutters 164 to illustrate their paths.

The beam let 210' is further divided into beamlets 210' by the OPE 194 and the EPE 196 as described above with respect to FIG. 6. The beam lets 210' also exit the LOE 190 via the EPE 196 toward the user's eye as described above. Only select duplicate system components, beams 210 and beam lets 210' are labeled for clarity.

Further, the ICG 192 is depicted on the top surface of the top LOE 190 and on the sides of all on the LOEs 190. This side view demonstrates that the ICG 192 of each of the stack of LOEs 190 is disposed in a different location on the face of its LOE 190 to allow each ICG 192 in the stack of LOEs 190 to be addressed by a separate beam splitter 162 in the distribution device. Because each beam splitter 162 is separated by its respective ICG 192 by a controllable shutter, the system 100 can select one LOE 190 to be illuminated by a beamlet 210' at a particular time.

The system depicted in FIG. 8 also includes an optional focusing optical element 304, which addresses the second encounter problem described above, by focusing the diverging beam lets 210' at an LOE 190 between the light distributor 300 and the corresponding ICG 192 in the corresponding LOE 190. Focusing the diverging beam lets 210' at the focusing optical element 304 causes the beam lets 210' to converged onto the ICG 192, thereby reducing the size of the ICG 192 required to in-couple the full range of beam lets 210' delivered by the light distributor 300.

FIG. 9 depicts an optical system 100 according to another embodiment, which includes a plurality (e.g., four) of LOEs 190, each having an ICG 192, an OPE 194, and an EPE 196. Each of the plurality of LOEs 190 can be configured to deliver light to a user's eye such that the light has a particular color and/or appears to originate from a particular depth plane. The system 100 also includes a light source 120 configured to direct a virtual light beam 210 into a light distributor 300. The light distributor 300 is configured to divide the light beam 210 into a plurality (e.g., four) of beam lets 210', and to direct the beamlets 210' toward respective shutters 164 and respective ICGs 192 behind the shutters 164.

The light distributor 300 has a plurality (e.g., five) of beam splitters 162 arranged in an "L" shape. The "L" shape is formed from an in-coupling beam splitter 308 and two "arms" 306 connected thereto. Each of the arms 306 includes two beam splitters 162. The beam splitters 162 in the arms 306 can be of any type, including, but not limited to, partially reflective beam splitters, dichroic beam splitters (e.g., dichroic mirror prisms), or polarizing beam splitters, such as a wire-grid beam splitter. Dichroic and polarizing beam splitters separate light based on wavelength (i.e., color) and polarization, respectively. While the in-coupling beam splitter 308 in this embodiment is a partially reflective beam splitter (e.g., 50% reflective and 50% transmissive), the in-coupling beam splitter 308 in other embodiments can be dichroic or polarizing beam splitters.

The in-coupling beam splitter 308 is configured to admit the virtual light beam 210 from the light source 120, and divide it into two beam lets 210' for propagation by TIR along the two arms 306. The two beamlets 210' propagate through the arms 306 and interact with the beam splitters 162 therein in a similar fashion to as the beam 210 interacts with the beam splitters 162 in the light distributor 300 depicted in FIG. 7. While the shutters 164 in FIG. 9 are depicted as closed, they are configured to open one at a time to allow only one beamlet 210' to address its respective ICG 192 and propagate through its respective LOE 190 by TIR. In the LOE 190, the beamlet 210' is further divided into beamlets 210' by the OPE 194 and the EPE 196 as described above with respect to FIG. 6. The beam lets 210' also exit the LOE 190 via the EPE 196 toward the user's eye as described above. Only select duplicate system components, beams 210 and beam lets 210' are labeled for clarity. Because each beam splitter 162 is separated by its respective ICG 192 by a controllable shutter, the system 100 can select one LOE 190 to be illuminated by a beamlet 210' at a particular time.

The "L" shape of the light distributor 300 depicted in FIG. 9 results in the positioning of the shutters 164 in an approximate "L" shape in the system 100 depicted in FIG. 9. The "L" shape of the light distributor 300 also results in the positioning of the ICGs 192 in an approximate "L" shape in the system 100 depicted in FIG. 9. The "L" shape depicted in FIG. 9 is a more compact spatial distribution of ICGs 192 compared to the linear shape depicted in FIG. 7. The "L" shape also provides fewer opportunities for inadvertent in-coupling of light from adjacent ICGs 192. Both of these features are evident from FIG. 10, which is a top view of the light distributor 300 depicted in FIG. 9.

FIG. 11 is a top view of the light distributor 300 according to still another embodiment. In the light distributor 300 the in-coupling beam splitter 308 and the beam splitters 162 that form the arms 306 are of different sizes. The larger beam splitters 162, 308 can accommodate light having larger scan angles and concomitant larger FOVs. The size of the beam splitters 162 can be optimized based on the scan angle requirements of the LOE 190 corresponding to the beam splitter 162. For instance, the system 100 and/or beam splitter 162 sizes can be optimized by balancing at least the following scan angle considerations/metrics: the number and size of LOEs 190 in the system 100; maximizing FOV size; maximizing exit pupil size; reducing second encounter problem (e.g., by reducing ICG 192 size).

The shapes of the light distributors 300 in FIGS. 9 to 11 require corresponding arrangements of shutters 164 and ICGs in the LOEs 190 of the systems 100. Also, the shapes of the light distributors 300 result in particular positional relationships between the light sources 120 and the light distributors 300, which in turn result in corresponding overall system profiles.

Figure 12:
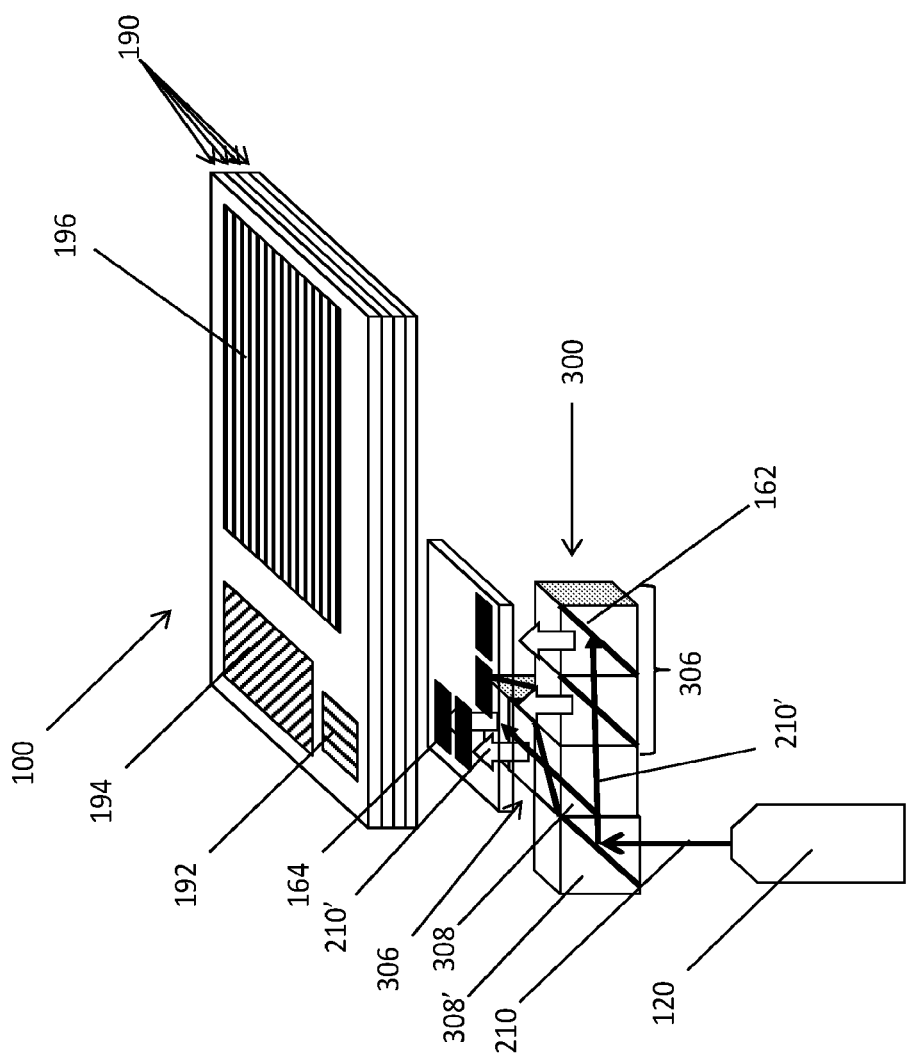
FIG. 12 is a detailed perspective view of an optical system according to one embodiment.

FIG. 12 depicts an optical system 100 according to yet another embodiment. The system 100 in FIG. 12 is almost identical to the one depicted in FIG. 9. The difference is the addition of a second in-coupling beam splitter 308'. The second in-couple beam splitter 308' is configured to allow the light source 120 to address the light distributor 300 from below the plane of the light distributor 300 instead of in the plane of the light distributor 300, as in FIG. 9. This design change allows the light source 120, which may be sizeable in some embodiments, to be located in a different position in the system 100.

Figure 13:
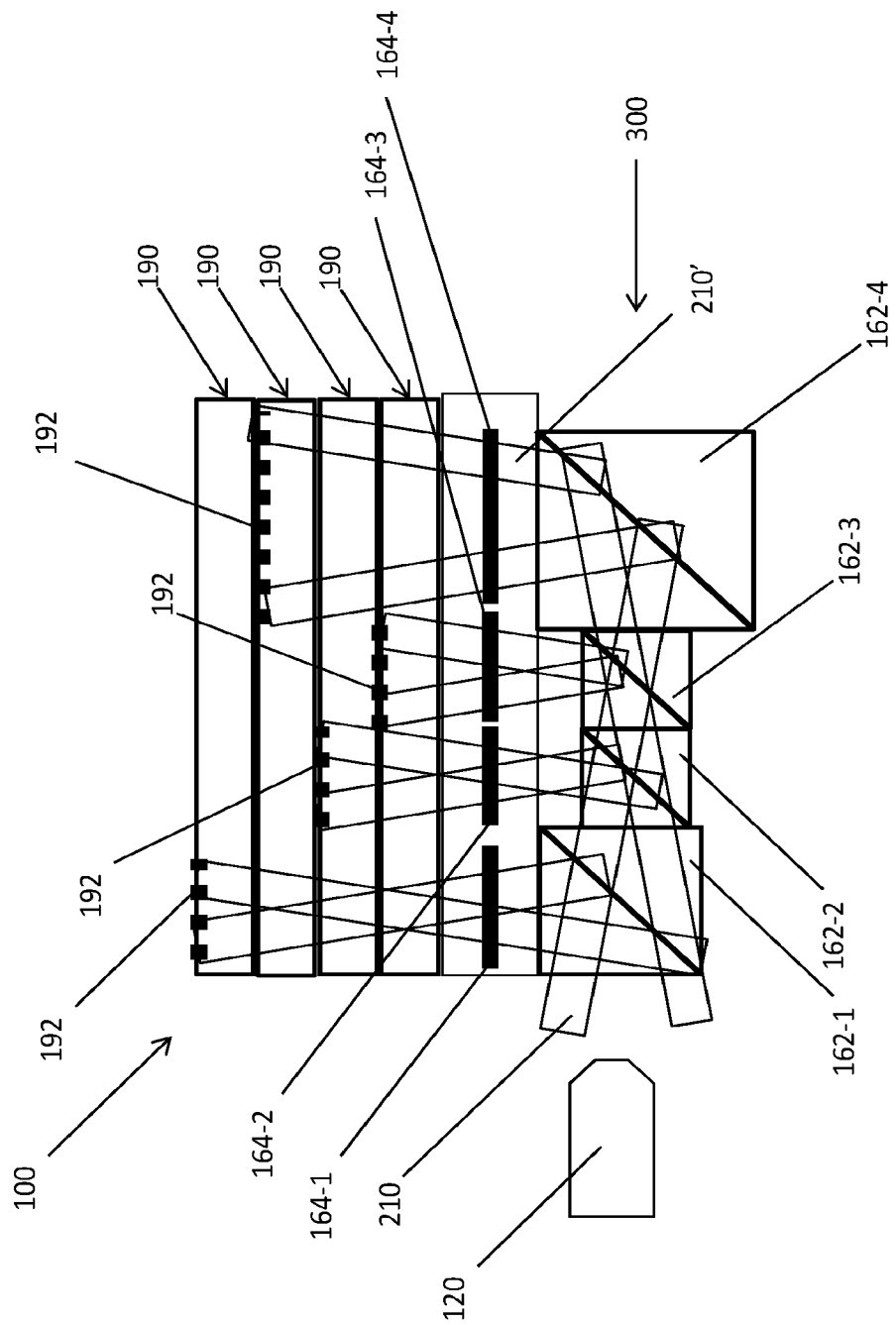

FIG. 13 schematically depicts an optical system 100 according to another embodiment. In this embodiment, the light distributor 300 is formed of beam splitters 162 having different sizes, which allows optimization of the system 100 according to the scan angle requirements of the LOE 190 corresponding to the beam splitter 162. In some embodiments, the system 100 and/or beam splitter 162 sizes can be optimized by balancing at least the following scan angle considerations/metrics: the number and size of LOEs 190 in the system 100; maximizing FOV size; maximizing exit pupil size; reducing second encounter problem (e.g., by reducing ICG 192 size). For instance, a first beam splitter 162-1 is a cube with a side length of 1.5 mm. The corresponding first shutter 164-1 has a length of 1.5 mm. A second beam splitter 162-2 is a cube with a side length of 1 mm. The corresponding second shutter 164-2 has a length of 1 mm. A third beam splitter 162-3 is a cube with a side length of 1.5 mm. The corresponding third shutter 164-3 has a length of 1.2 mm. A fourth beam splitter 162-4 is a cube with a side length of 2 mm. The corresponding fourth shutter 164-4 has a length of 1.8 mm.

The system 100 also includes respective pluralities (e.g., four) of LOEs 190 and ICGs 192 corresponding thereto. As shown in FIG. 13, the size (e.g., length) of the shutters 164 and ICGs 192 are a function of the distances between (1) the light source 120 and the corresponding beam splitter 162 and (2) the corresponding beam splitter and the corresponding ICG 192. This is because these distances will determine whether the virtual light beams 210 and beam lets 210' are converging or diverging when they interact with the beam splitter 162, the shutter 164, and ICGs 192. Only select beams 210 and beam lets 210' are labeled for clarity. While the shutters 164 in FIG. 13 are depicted as closed, they are configured to open one at a time to allow only one beam let 210' to address its respective ICG 192 and propagate through its respective LOE 190 by TIR. The beam lets 210' in FIG. 13 are depicted as passing through their respective closed shutters 164 to illustrate their paths.

Figure 14:
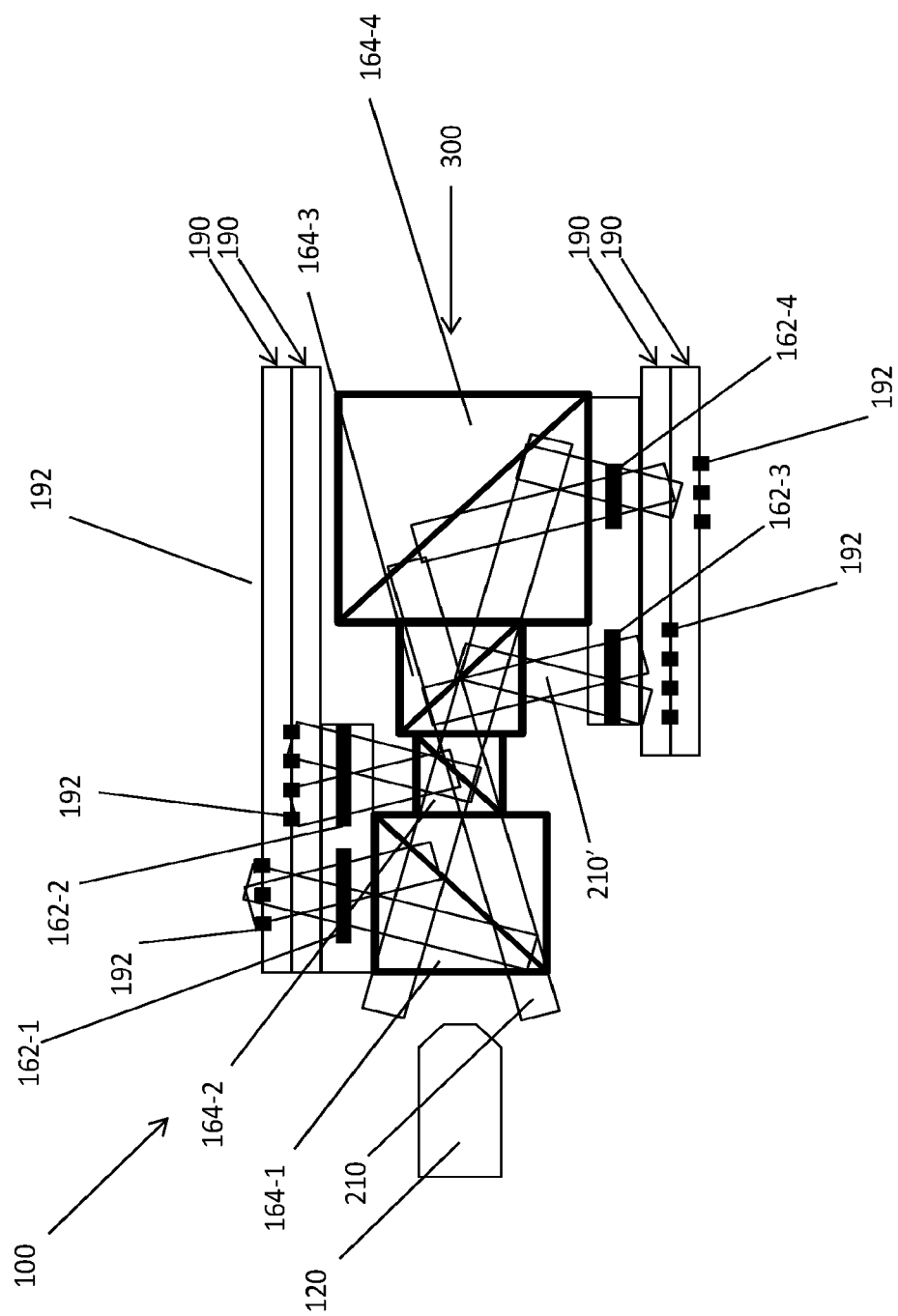

FIG. 14 schematically depicts an optical system 100 according to still another embodiment. Like the light distributor depicted in FIG. 13, the light distributor 300 depicted in FIG. 14 is formed of beam splitters 162 having different sizes, which allows optimization of the system 100 according to the scan angle requirements of the LOE 190 corresponding to the beam splitter 162. For instance, the system 100 and/or beam splitter 162 sizes can be optimized by balancing at least the following scan angle considerations/metrics: the number and size of LOEs 190 in the system 100; maximizing FOV size; maximizing exit pupil size; reducing second encounter problem (e.g., by reducing ICG 192 size). Unlike the system 100 depicted in FIG. 13, the system 100 depicted in FIG. 14 includes LOEs 190 and shutters 164 disposed on opposite sides of the beam splitters 162. This configuration shortens the light path for some LOEs 190, thereby reducing the size of the corresponding ICGs 192 for diverging light beamlets 210'. Reducing the size of ICGs 192 improves optical efficiency by avoiding the second encounter problem. Disposing LOEs 190 (and shutters 164) on opposite sides of the beam splitters 162 requires some of the beam splitters 162-1, 162-2 to direct light in a first orthogonal direction and other beam splitters 162-3, 162-4 to direct light in a second orthogonal direction opposite Only select beams 210 and beam lets 210' in FIG. 14 are labeled for clarity. While the shutters 164 in FIG. 14 are depicted as closed, they are configured to open one at a time to allow only one beam let 210' to address its respective ICG 192 and propagate through its respective LOE 190 by TIR. The beam lets 210' in FIG. 14 are depicted as passing through their respective closed shutters 164 to illustrate their paths.

FIGS. 15 and 16 depict optical systems 100 according to two other embodiments. The systems 100 depicted in FIGS. 15 and 16 are similar to the systems 100 depicted in FIGS. 9 and 12, because the systems 100 depicted in FIGS. 9, 12, 15, and 16 each have four LOEs 190. The differences in the systems 100 are driven by the different configurations of the light distributors 300 therein. The light distributor 300 in FIG. 15 has two parallel arms 306 (formed of beam splitters 162) that are connected by an in-coupling beam splitter 308 and offset from each other in the X and Y axes. The light distributor 300 in FIG. 16 has two perpendicular arms 306 (formed of beam splitters 162) that are connected by an in-coupling beam splitter 308 and offset from each other in the Y axis.

The different configurations of the light distributors 300 in FIGS. 15 and 16 lead to differences in the configurations of the shutters 164 (only shown in FIG. 16) and LOEs 190. The different light distributor 300, shutter 164, and LOE 190 configurations can be used to customize the three dimensional footprint of the optical system 100 to provide a particular device form factor. Only select system components, beams 210 and beam lets 210' are included and labeled in FIGS. 15 and 16 for clarity. While the shutters 164 in FIG. 16 are depicted as closed, they are configured to open one at a time to allow only one beam let 210' to address its respective ICG 192 and propagate through its respective LOE 190 by TIR.

Figure 17:
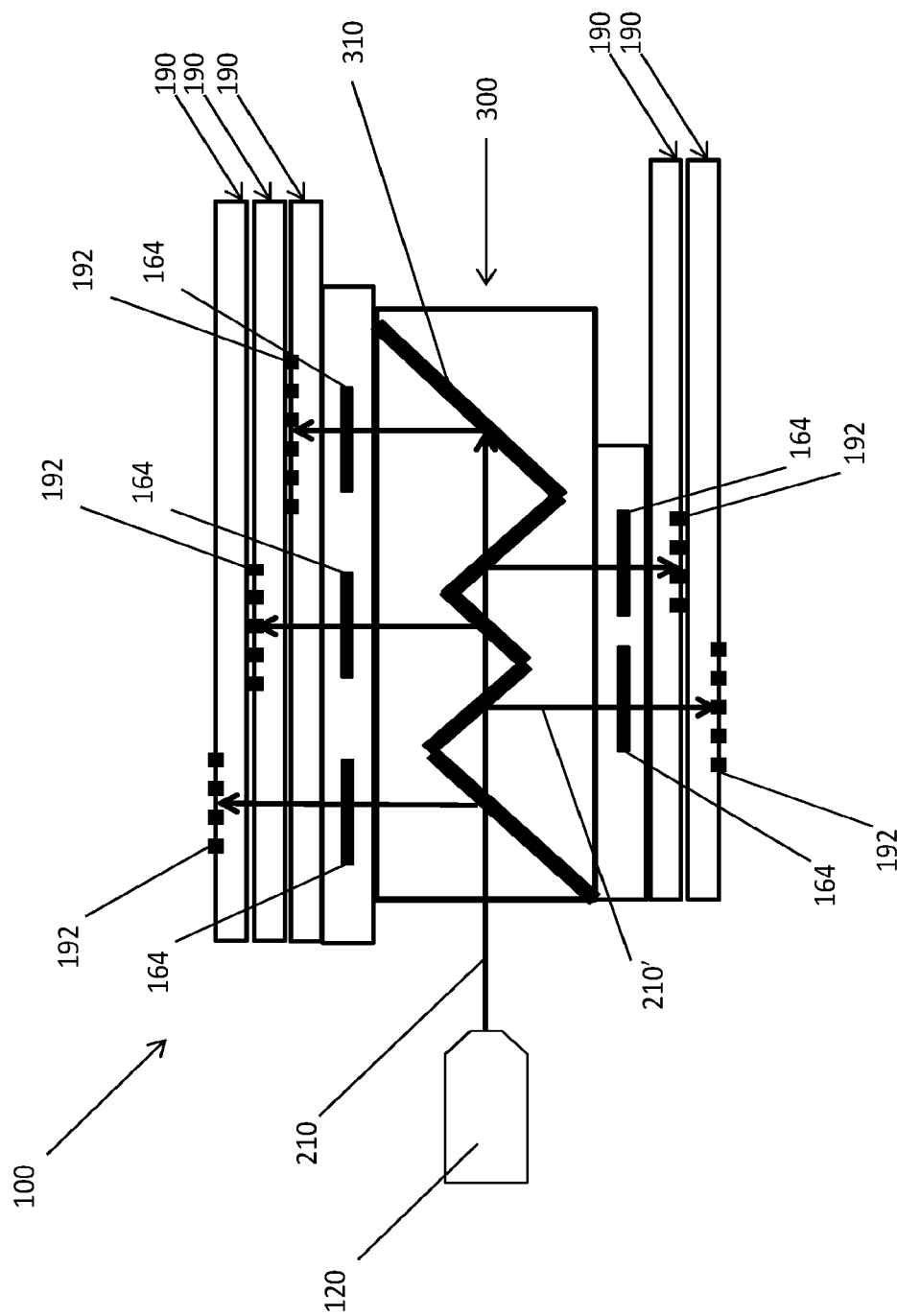
FIG. 17 is a detailed schematic view of an optical system according to one embodiment.

FIG. 17 schematically depicts an optical system 100 according to another embodiment, which has a plurality (e.g., five) LOEs 190. The system 100 depicted in FIG. 17 is similar to the system 100 depicted in FIG. 14 because the system 100 includes LOEs 190 and shutters 164 disposed on opposite sides of the beam splitters 162. As described above, this configuration shortens the light path for some LOEs 190, thereby reducing the size of the corresponding ICGs 192 for diverging light beamlets 210' and reducing the second encounter problem.

The main difference between the systems 100 depicted in FIGS. 14 and 17 is that the light distributor 300 depicted in FIG. 17 is an integral optical element instead of a plurality of beam splitters 162, as shown in FIG. 14. The light distributor 300 in FIG. 17 includes an irregularly shaped DOE 310 that is configured to divide the virtual light beam 210 into a plurality (e.g., five) beamlets 210' and to direct those beamlets 210' toward respective shutters 164 and respective ICGs 192 behind the shutters 164. Portions of the irregularly shaped DOE 310 are configured to direct beam lets 210' having a larger size or scanning angle, thereby increasing the resolution of the system 100.

Only select system components, beams 210 and beam lets 210' are included and labeled in FIG. 17 for clarity. While the shutters 164 in FIG. 17 are depicted as closed, they are configured to open one at a time to allow only one beam let 210' to address its respective ICG 192 and propagate through its respective LOE 190 by TIR.

FIGS. 18 to 20 depict optical systems 100 and light distributors 300 located therein according to three other embodiments. The systems 100 and light distributors 300 depicted in FIGS. 18 to 20 are similar to the systems 100 and light distributors 300 depicted in FIGS. 9, 12, 15, and 16, however the systems 100 each have different light distributor 300 and LOE 190 configurations. The systems 100 and light distributors 300 depicted in FIGS. 18 to 20 are similar to each other because they all accommodate six channels for six LOEs. Since three single-color LOEs 190 are required to display a color image at a single depth plane, the six LOEs 190 of these systems 100 can display color images at two depth planes.

The differences in the systems 100 depicted in FIGS. 18 to 20 (and FIGS. 9, 12, 15, and 16) are driven by the different configurations of the light distributors 300 therein. The light distributor 300 in FIG. 18 has three arms 306-1, 306-2, 306-3 (formed of beam splitters 162) that are connected by two in-coupling beam splitters 308. Two of the arms 306-1, 306-2 are parallel but offset from each other in the Y and Z axes. The other arm 306-3 is perpendicular to the first two arms 306-1, 306-2 and offset from the other two arms 306-1, 306-2 in the X and Y axes. The beam splitters 162 in the arms 306-1, 306-2, 306-3 can be of any type, including, but not limited to, partially reflective beam splitters, dichroic beam splitters (e.g., dichroic mirror prisms), or polarizing beam splitters, such as a wire-grid beam splitter. While the in-coupling beam splitters 308 in this embodiment are partially reflective beam splitters, the in-coupling beam splitter 308 in other embodiments can be dichroic or polarizing beam splitters.

The light distributor 300 in FIG. 19 has two arms 306-1, 306-2 (formed of beam splitters 162) that are connected by an in-coupling beam splitter 308. The arms 306-1, 306-2 are disposed on one axis with the in-coupling beam splitter 308 therebetween. The in-coupling beam splitter 308 is an X-cube beam splitter configured to direct half of the light beam 210 into the first arm 306-1 and the other half into the second arm 306-2. Some of the beam splitters 162 in the arms 306-1, 306-2 can be polarizing beam splitters configured to redirect only one color of light based on it polarization.

For instance, the first beam splitter 162-1 adjacent the in-coupling beam splitter 308 (in each of the first and second arms 306-1, 306-2) can be configured to redirect green light (with 0 degrees polarization) out of the beam splitter 162-1 while allowing red and blue (each with 90 degrees polarization) light to proceed through the beam splitter 162-1. A retardation filter 312 is disposed between the first beam splitter 162-1 and the second beam splitter 162-2. The retardation filter 312 is configured to change the polarization of only the red light from 90 degrees to 0 degrees, leaving the blue light with 90 degrees polarization. The second beam splitter 162-2 can be configured to redirect red light (with 0 degrees polarization after passing through retardation filter 312) out of the beam splitter 162-2 but allow blue (with 90 degrees polarization) light to proceed through the beam splitter 162-2. The third "beam splitter" 162-3 can be replaced with a simple 45 degree mirror. Alternatively, the third beam splitter 162-3 can be dichroic beam splitter configured to redirect blue light out of the beam splitter 162-3.

The light distributor 300 in FIG. 20 has three arms 306-1, 306-2, 306-3 (formed of beam splitters 162) that are connected by an in-coupling beam splitter 308. The arms 306-1, 306-2, 306-3 form a "T" shape rotated 90 degrees counter-clockwise with the in-coupling beam splitter 308 at the junction of the "T" shape. The in-coupling beam splitter 308 is a dichroic beam splitter or dichroic mirror prism configured to direct red light into the first arm 306-1 and blue light into the third arm 306-3, and to allow green light to pass through into the second arm 306-2. Each beam splitter 162 can be partially reflective to direct a portion of the colored light out of the beam splitter and into the corresponding LOE (not shown).

The dichroic beam splitters, dichroic mirror prisms, polarization beam splitters, and retardation filters can be used to design various light distributors 300 configured to generate beam lets 210' with a particular color.

The different configurations of the light distributors 300 in FIGS. 18 to 20 lead to differences in the configurations of the shutters 164 and LOEs 190 (only shown in FIGS. 18 and 19). The different light distributor 300, shutter 164, and LOE 190 configurations can be used to customize the three dimensional footprint of the optical system 100 to provide a particular device form factor. Only select system components, beams 210 and beam lets 210' are included and labeled in FIGS. 18 to 20 for clarity. While the shutters 164 in FIG. 16 are depicted as closed, they are configured to open one at a time to allow only one beamlet 210' to address its respective ICG 192 and propagate through its respective LOE 190 by TIR.

FIGS. 21 to 23 depict an optical system 100, from perspective, top, and side views respectively, according to another embodiment. The system 100 and light distributor 300 depicted in FIGS. 21 to 23 are similar to the systems 100 and light distributors 300 depicted in FIGS. 9, 12, 15, 16, and 18 to 20, however the systems 100 each have different light distributor 300 and LOE 190 configurations. The systems 100 and light distributors 300 depicted in FIGS. 21 to 23 are similar to those depicted in FIGS. 18 to 20 because they all accommodate six channels for six LOEs.

The light distributor 300 depicted in depicted in FIGS. 21 to 23 has two arms 306-1, 306-2 (formed of beam splitters 162) that are connected by two in-coupling beam splitters 308. The arms 306-1, 306-2 are parallel but offset from each other in the Z axis. The in-coupling beam splitters 308 are partially reflective beam splitters configured to direct half of the light beam 210 into the first arm 306-1 and the other half into the second arm 306-2. The second in-coupling "beam splitter" 308 can be replaced with a simple 45 degree mirror. Some of the beam splitters 162 in the arms 306-1, 306-2 can be polarizing beam splitters configured to redirect only one color of light based on it polarization.

For instance, a first retardation filter 312 is disposed between the in-coupling beam splitters 308 and the first beam splitter 162-1. The first retardation filter 312 is configured to change the polarization of red and blue light from 0 degrees to 90 degrees, while leaving the polarization of green light at 0 degrees. The first beam splitter 162-1 adjacent the in-coupling beam splitter 308 and the first retardation filter 312 can be configured to redirect green light (with 0 degrees polarization) out of the beam splitter 162-1 but allow red and blue (each with 90 degrees polarization) light to proceed through the beam splitter 162-1.

A second retardation filter 312 is disposed between the first beam splitter 162-1 and the second beam splitter 162-2. The second retardation filter 312 is configured to change the polarization of only red light from 90 degrees to 0 degrees, leaving blue light with 90 degrees polarization. The second beam splitter 162-2 can be configured to redirect red light (with 0 degrees polarization after passing through second retardation filter 312) out of the beam splitter 162-2 but allow blue light (with 90 degrees polarization) to proceed through the beam splitter 162-2. The third "beam splitter" 162-3 can be a simple 45 degree mirror. Alternatively, the third beam splitter 162-3 can be dichroic beam splitter configured to redirect blue light out of the beam splitter 162-3. A half-wave plate 314 is disposed between the third beam splitter 162-3 and the LOE 190 to restore the blue light to 0 degrees polarization. The beam splitters 162-1, 162-2, 162-3 in both the first and second arms 306-1, 306-2 function in a similar manner.

FIG. 24 depicts an optical system 100 according to another embodiment. The system 100 depicted in FIG. 24 is similar to the system 100 depicted in FIGS. 21 to 23, however the light distributors 300 in the systems 100 have beam splitters 162 with different aspect ratios. The beam splitters 162 depicted in FIGS. 21 to 23 are cubes with equal sides (e.g., 3 mm). The beam splitters 162 depicted in FIG. 24 are 3 mm by 3 mm by 5 mm. The 5 mm size in the Z direction means that the faces of the beam splitters 162 through which light is directed (i.e., the Y-Z plane and the X-Z plane) have a 3 by 5 aspect ratio. This aspect ratio provides a directional increase in scan angle.

FIG. 25 depicts a light distributor 300 similar to the one depicted in FIG. 24 in that the beam splitters 162 in both light distributors 300 have a 3 by 5 aspect ratio. However, while the two in-coupling beam splitters 308 in FIG. 24 are effectively the same size, the two in-coupling beam splitters 308 in FIG. 25 have different sizes. For instance, the first in-coupling beam splitter 308-1 in FIG. 25 is 5 mm×3 mm×5 mm, and the second in-coupling beam splitter 308-2 is 5 mm×3 mm×3 mm. Changing the size of the in-coupling beam splitters 308 changes the scan angles of the two arms 306-1, 306-2.

Figure 26:
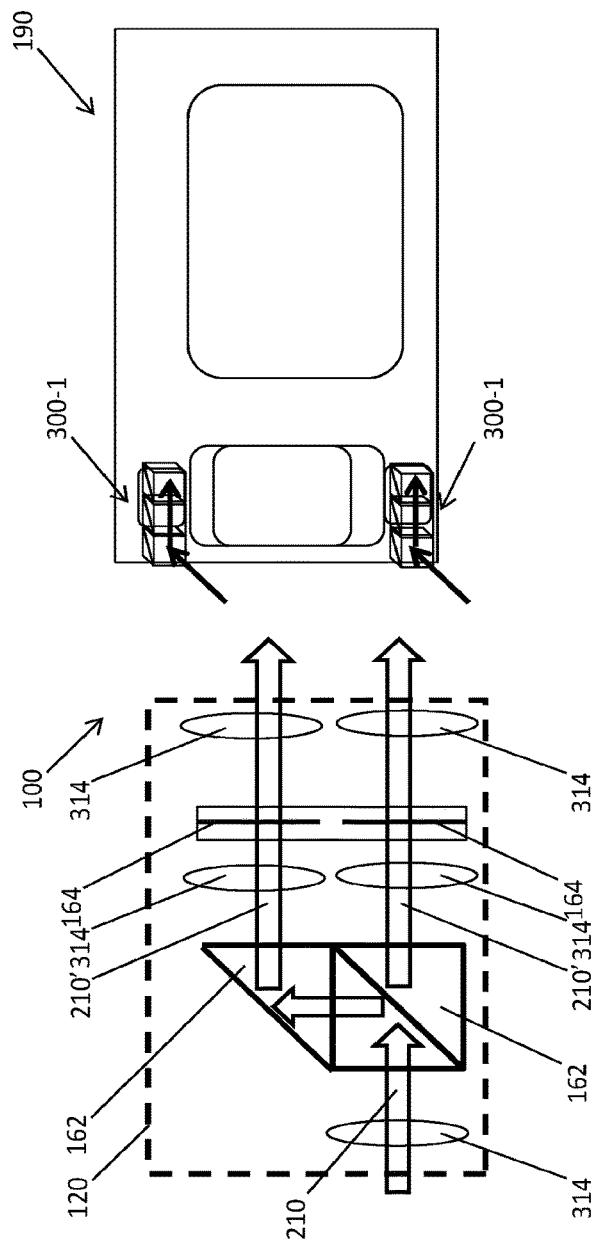
FIG. 26 is a schematic view of an optical system according to one embodiment.

FIG. 26 depicts an optical system 100 according to another embodiment. The system 100 includes a plurality of LOEs 190, first and second light distributors 300-1, 300-2, and a dual beam light source 120. The dual beam light source 120 is configured to divide a single virtual light beam 210 into two spatially separated beamlets 210' that can be directed into first and second light distributors 300-1, 300-2, respectively. The dual beam light source 120 includes two beam splitters 162, two shutters 164, and various focusing optical elements 316. The beam splitters 162 can be of any type, including, but not limited to, partially reflective beam splitters, dichroic beam splitters (e.g., dichroic mirror prisms), or polarizing beam splitters, such as a wire-grid beam splitter. Moving two beam splitters 162 and shutters 164 from the light distributor 300 into the light source 120, and splitting one light distributor 300 into two light distributors 300-1, 300-2 changes the overall system configuration and form factor.

Figure 27:
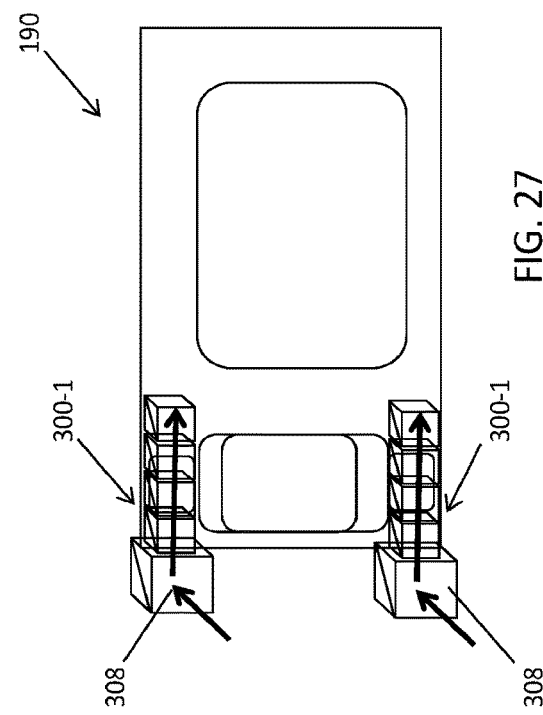
FIG. 27 is a schematic view of a light guiding optical element and two light distributors configured for use with the optical system depicted in FIG. 26.

FIG. 27 depicts a plurality of LOEs 190 and two light distributors 300-1, 300-2 according to another embodiment and configured for use with the system 100 depicted in FIG. 26. The light distributors 300-1, 300-2 in FIG. 27 include respective in-coupling beam splitters 308 that are larger than the size of the beam splitters forming the light distributors 300-1, 300-2 to allow larger scan angles.

Figure 28:
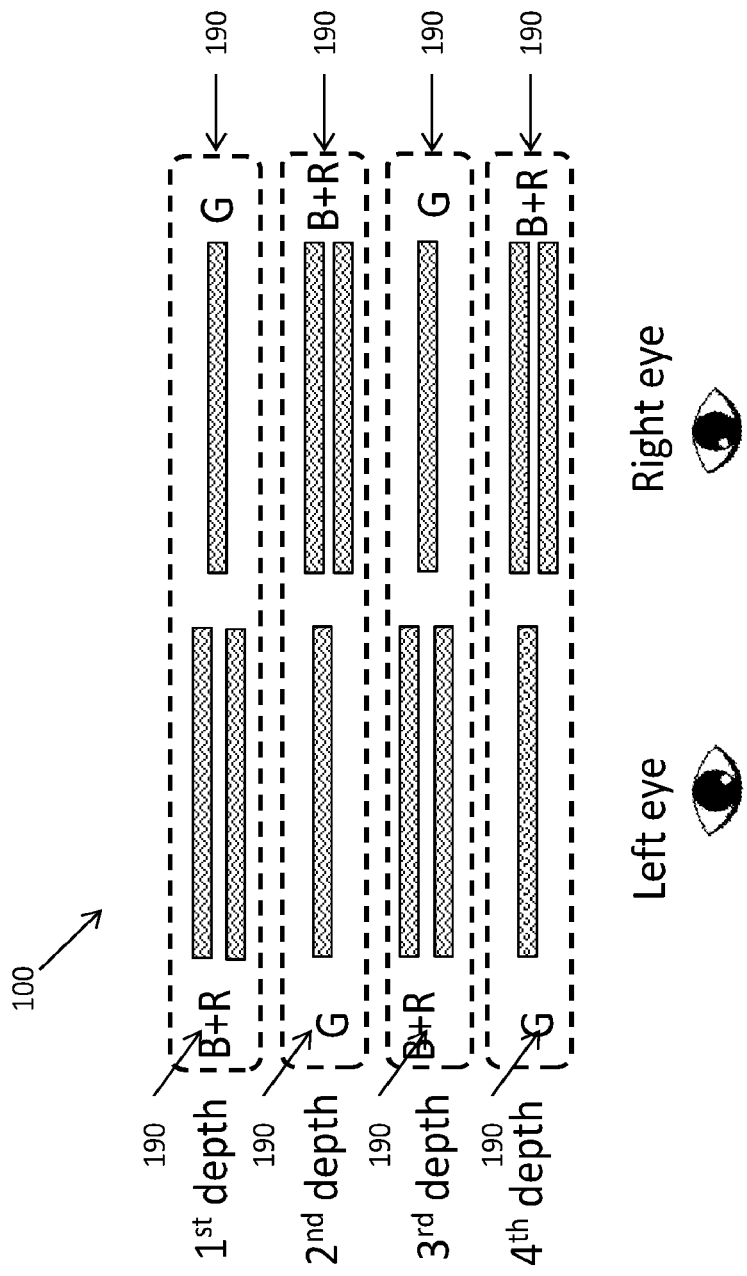
FIGS. 28 and 29 are schematic views of optical systems according to two embodiments.

FIG. 28 schematically depicts an optical system 100 according to yet another embodiment. This system 100 combines the red and blue light into one LOE 190 to reduce the number of LOEs 190 needed to render an acceptable color image at one depth plane from three to two. Accordingly, the system 100 depicted in FIG. 28 generates acceptable full color images at four depth planes using eight LOEs 190 instead of twelve. This reduction in the number of LOEs 190 and corresponding optical elements (e.g., lenses, beam splitters 162, shutters 164, etc.) reduces the overall size of the system 100.

Figure 29:
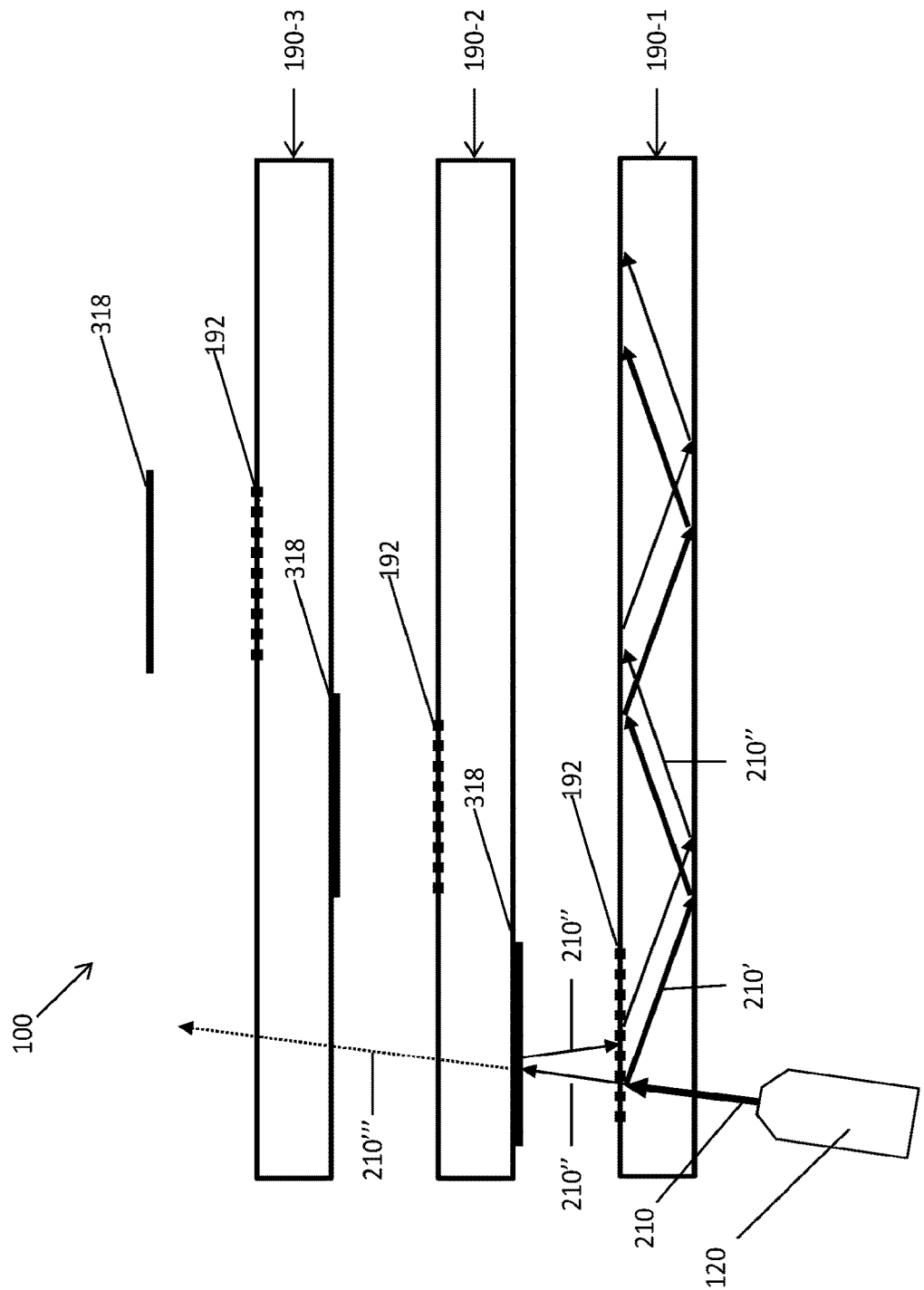

FIG. 29 depicts an optical system 100 according to another embodiment. The system 100 depicted in FIG. 29 addresses the inadvertent out-coupling problem. The system 100 includes a light source 120 and three LOEs 190. The light source 120 is configured to direct a virtual light beam 210 toward an ICG 192 of a first LOE 190-1. While the ICG 192 is configured to direct the beam 210 into the first LOE 190-1 to propagate by TIR therethrough, only a first portion of the beam 210' is directed into the first LOE 190-1. Because ICG 192 efficiency is less than 100% (e.g., 50%), a second portion of the beam 210" passes through the ICG 192 and out of the first LOE 190-1. This second portion of the beam 210" can escape the system 100, as shown by the dotted line 210'" in FIG. 29, thereby reducing optical efficiency and beam density.

The system 100 in FIG. 29 addresses this problem by disposing a mirror coating 318 on the other side of the light source 120 from the ICG 192. In particular, the mirror coating 318 is disposed on the side of a second LOE 190-2 that is closest to the ICG 192. The mirror coating 318 and the ICG 192 are configured such that the second portion of the beam 210" reflects off of the mirror coating 318 and re-enters the ICG 192 of the first LOE 190-1. This light 210" is in-coupled into the first LOE 190-1 and propagates therethrough by TIR, thereby increasing the optical efficiency and beam density of the system 100.

While some embodiments are described as using retardation filters 312, polarizing beam splitters 162, and half-wave plates 314 to configure light distributors 300 for redirection light of different colors, the specific embodiments are only illustrative and not meant to be limiting. Accordingly, such light distributors 300 can be configured to output colored light in any color order.

While some embodiments are described as having four channels, those systems can still be used to render acceptable full color virtual images at two depth planes because blue and red light can be delivered using the same channel to two LOEs. Optical systems using a single blue/red channel design to reduce the number of components are described in the above-referenced U.S. Prov. Patent Application Ser. No. 62/156,809, the contents of which have been previously incorporated by reference. Using this design, two channels (Green and Red/Blue) can be used to render an acceptable full color virtual image at one depth plane.

The above-described AR systems are provided as examples of various optical systems that can benefit from more selectively reflective optical elements. Accordingly, use of the optical systems described herein is not limited to the disclosed AR systems, but rather applicable to any optical system.

Various exemplary embodiments of the invention are described herein. Reference is made to these examples in a non-limiting sense. They are provided to illustrate more broadly applicable aspects of the invention. Various changes may be made to the invention described and equivalents may be substituted without departing from the true spirit and scope of the invention. In addition, many modifications may be made to adapt a particular situation, material, composition of matter, process, process act(s) or step(s) to the objective(s), spirit or scope of the present invention. Further, as will be appreciated by those with skill in the art that each of the individual variations described and illustrated herein has discrete components and features which may be readily separated from or combined with the features of any of the other several embodiments without departing from the scope or spirit of the present inventions. All such modifications are intended to be within the scope of claims associated with this disclosure.

The invention includes methods that may be performed using the subject devices. The methods may comprise the act of providing such a suitable device. Such provision may be performed by the end user. In other words, the "providing" act merely requires the end user obtain, access, approach, position, set-up, activate, power-up or otherwise act to provide the requisite device in the subject method. Methods recited herein may be carried out in any order of the recited events which is logically possible, as well as in the recited order of events.

Exemplary aspects of the invention, together with details regarding material selection and manufacture have been set forth above. As for other details of the present invention, these may be appreciated in connection with the above-referenced patents and publications as well as generally known or appreciated by those with skill in the art. The same may hold true with respect to method-based aspects of the invention in terms of additional acts as commonly or logically employed.

In addition, though the invention has been described in reference to several examples optionally incorporating various features, the invention is not to be limited to that which is described or indicated as contemplated with respect to each variation of the invention. Various changes may be made to the invention described and equivalents (whether recited herein or not included for the sake of some brevity) may be substituted without departing from the true spirit and scope of the invention. In addition, where a range of values is provided, it is understood that every intervening value, between the upper and lower limit of that range and any other stated or intervening value in that stated range, is encompassed within the invention.

Also, it is contemplated that any optional feature of the inventive variations described may be set forth and claimed independently, or in combination with any one or more of the features described herein. Reference to a singular item, includes the possibility that there are plural of the same items present. More specifically, as used herein and in claims associated hereto, the singular forms "a," "an," "said," and "the" include plural referents unless the specifically stated otherwise. In other words, use of the articles allow for "at least one" of the subject item in the description above as well as claims associated with this disclosure. It is further noted that such claims may be drafted to exclude any optional element. As such, this statement is intended to serve as antecedent basis for use of such exclusive terminology as "solely," "only" and the like in connection with the recitation of claim elements, or use of a "negative" limitation.

Without the use of such exclusive terminology, the term "comprising" in claims associated with this disclosure shall allow for the inclusion of any additional element—irrespective of whether a given number of elements are enumerated in such claims, or the addition of a feature could be regarded as transforming the nature of an element set forth in such claims. Except as specifically defined herein, all technical and scientific terms used herein are to be given as broad a commonly understood meaning as possible while maintaining claim validity.

The breadth of the present invention is not to be limited to the examples provided and/or the subject specification, but rather only by the scope of claim language associated with this disclosure.

In the foregoing specification, the invention has been described with reference to specific embodiments thereof. It will, however, be evident that various modifications and changes may be made thereto without departing from the broader spirit and scope of the invention. For example, the above-described process flows are described with reference to a particular ordering of process actions. However, the ordering of many of the described process actions may be changed without affecting the scope or operation of the invention. The specification and drawings are, accordingly, to be regarded in an illustrative rather than restrictive sense.

The invention claimed is:

1. An imaging system, comprising:
   a light source configured to generate a light beam;
   a first light guiding optical element including a first entry portion and configured to propagate at least a first portion of the light beam by total internal reflection;
   a second light guiding optical element including a second entry portion and configured to propagate at least a second portion of the light beam by total internal reflection; and
   a light distributor including a single light distributor entry portion, a first exit portion on a first arm and a second exit portion, distinct from the first exit portion, on a second arm, the light distributor configured to direct at least the first and second portions of the light beam into the first and second light guiding optical elements, respectively,
   wherein the single light distributor entry portion is disposed between the first and second exit portions,
   wherein the first arm is perpendicular to the second arm, and
   wherein the first and second arms are separated from each other along an axis orthogonal to both respective first and second axes of the first and second arms.

2. The system of claim 1, wherein the first and second light guiding optical elements and the light distributor are configured such that:
   when the light beam interacts with the first exit portion, a first exit beamlet of the light beam exits the light distributor and enters the first light guiding optical element via the first entry portion, and
   when the light beam interacts with the second exit portion, a second exit beamlet of the light beam exits the light distributor and enters the second light guiding optical element via the second entry portion.

3. The system of claim 1, further comprising first and second shutters configured to selectively interrupt first and second light paths between the first and second exit portions and the first and second entry portions, respectively.

4. The system of claim 1, wherein the first and second light guiding optical elements are disposed on opposite sides of the light distributor.

5. The system of claim 1, further comprising a focusing diffractive optical element disposed between the first and second light guiding optical elements,
    wherein the focusing diffractive optical element is configured to focus the second exit beamlet of the light beam toward the second entry portion of the second light guiding optical element.

6. The system of claim 1, wherein the first exit portion is a first beam splitter, and wherein the second exit portion is a second beam splitter.

7. The system of claim 6, wherein the first and second beam splitters have different sizes.

8. The system of claim 7, wherein the first and second entry portions have different sizes corresponding to the different sizes of the first and second beam splitters.

9. The system of claim 6, where the single light distributor entry portion is a receiving beam splitter configured to divide the light beam into first and second split beamlets respectively directed to the first and second beam splitters.

10. The system of claim 9, wherein the receiving beam splitter is a dichroic beam splitter.

11. The system of claim 10, wherein the first split beamlet includes green light and the second split beamlet includes red and blue light.

12. The system of claim 9, wherein the receiving beam splitter is a polarizing beam splitter, and wherein the light beam comprises polarized light.

13. The system of claim 12, wherein the polarized light includes green light,
    wherein the light distributor also has a retardation filter configured to change a polarization angle of a portion of the light beam, and
    wherein the portion of the light beam includes blue light.

14. The system of claim 9, wherein the receiving beam splitter is an X-cube beam splitter.

15. The system of claim 6, further comprising a third beam splitter disposed between the first beam splitter and the second beam splitter.

16. The system of claim 1, wherein the first exit portion and the second exit portion are a first out-coupling grating and a second out-coupling grating respectively,
    wherein the first and second light guiding optical elements and the light distributor are configured such that:
    when the light beam interacts with the first out-coupling grating, a first exit beamlet of the light beam exits the light distributor and enters the first light guiding optical element via the first entry portion, and
    when the light beam interacts with the second out-coupling grating, a second exit beamlet of the light beam exits the light distributor and enters the second light guiding optical element via the second entry portion.

17. The system of claim 16, wherein the first out-coupling grating is a dynamic grating.

18. The system of claim 16, wherein the first out-coupling grating is a static grating.

19. The system of claim 1, further comprising a third light guiding optical element including a third entry portion and configured to propagate at least a third portion of the light beam by total internal reflection,
    wherein the light distributor also a third exit portion, and
    wherein the light distributor is configured to direct at least the first, second, and third portions of the light beam into the first, second, and third light guiding optical elements, respectively.

20. The system of claim 19, wherein the first portion of the light beam is red,
    wherein the second portion of the light beam is green, and
    wherein the third portion of the light beam is blue.

* * * * *